US012694205B1

(12) United States Patent
Dell'Omo

(10) Patent No.: US 12,694,205 B1
(45) Date of Patent: Jul. 28, 2026

(54) SAMPLE RETRIEVAL AND USER INTERFACE GENERATOR

(71) Applicant: Tractian Technologies Inc, Atlanta, GA (US)

(72) Inventor: Canyon Grey Dell'Omo, Atlanta, GA (US)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/327,700

(22) Filed: Sep. 12, 2025

(51) Int. Cl.
*G06F 40/20* (2020.01)
*G06F 9/451* (2018.01)
*G06F 40/58* (2020.01)

(52) U.S. Cl.
CPC .............. *G06F 40/20* (2020.01); *G06F 9/451* (2018.02); *G06F 40/58* (2020.01)

(58) Field of Classification Search
CPC .......... G06F 40/20; G06F 9/451; G06F 40/58
See application file for complete search history.

(56) References Cited

U.S. PATENT DOCUMENTS

| | | | | |
|---|---|---|---|---|
| 12,038,958 | B1 * | 7/2024 | Soubbotin ............. | G06F 16/335 |
| 2017/0017638 | A1 * | 1/2017 | Satyavarta ........... | G06F 40/295 |
| 2018/0069899 | A1 * | 3/2018 | Lang ......................... | G06F 8/38 |
| 2019/0147346 | A1 * | 5/2019 | Reicher .................. | G16H 70/20 |
| | | | | 706/11 |
| 2019/0236473 | A1 * | 8/2019 | Subramaniyan .... | G06F 11/3466 |
| 2020/0272915 | A1 * | 8/2020 | Tata ........................ | G06F 16/35 |
| 2021/0398831 | A1 * | 12/2021 | Oberai ............... | H10P 72/0612 |
| 2023/0016946 | A1 * | 1/2023 | Wouhaybi ............. | G06F 16/908 |
| 2023/0222454 | A1 * | 7/2023 | Cella ...................... | B25J 9/1682 |
| | | | | 705/28 |
| 2024/0054035 | A1 * | 2/2024 | Bhargav ................. | G06N 3/006 |
| 2024/0231322 | A1 * | 7/2024 | Narayanan ......... | G05B 23/0229 |
| 2024/0346524 | A1 * | 10/2024 | Rojas Garcia ..... | G06Q 10/0635 |
| 2024/0362278 | A1 * | 10/2024 | PerezLeon .............. | G06F 40/40 |
| 2025/0044752 | A1 * | 2/2025 | SayyarRodsari .... | G05B 13/027 |
| 2025/0077847 | A1 * | 3/2025 | Carrara ................ | G06N 3/0475 |

\* cited by examiner

*Primary Examiner* — Nicholas Augustine
(74) *Attorney, Agent, or Firm* — Cognition IP, P.C.; Edward Steakley; Saleh Kaihani

(57) ABSTRACT

A maintenance and monitoring infrastructure can use a plurality of sensors or monitors in an industrial plant to obtain machine samples from a large collection of assets (industrial machines). An artificial-intelligence (AI) assistant can conversationally interact with a technician to answer questions regarding maintenance status of the assets in the plant. The technician can conversationally request various machine samples and/or associated interactive user interfaces to examine and analyze the samples in relation to maintenance and monitoring tasks. The AI assistant can identify and retrieve relevant data and in real-time build instructions for generating user interfaces responsive to the technician's conversational requests.

20 Claims, 17 Drawing Sheets

200

202    User
       Request    204                                    206
  ────────►  Primary  ◄──────►  Secondary
                                  Agent                Agent 206
                                              Secondary                 208
                                                Agent 210                                                           206
Visualization  ◄────                          Secondary
Frontend                                        Agent

⋮

212
Function 100          102          210

400

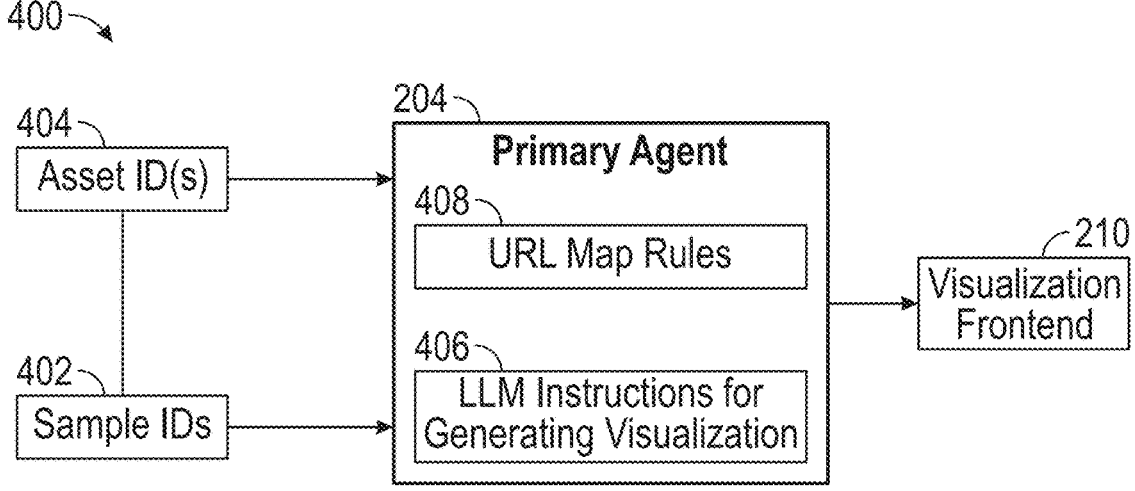

| Single Asset | Single Asset URL (Trend, Spectrum, etc.) |
|---|---|
| Comparing Multiple Assets | MACV URL (Asset ID#,ID#,... |
| URL Formatting Rules (Single Asset) | URL = http://address.com/trendgraph#, - Append Asset ID to URL - Append Sample ID to URL - Update Display / Reload the Formatted URL into a Browser Window |
| URL Formatting Rules (Multiple Asset Comparison), or MACV URL Formatting | Asset Comparison Graph (Spectrum View) - Choose Root Asset - Append Asset ID & Corresponding Sample IDs - Reload the Formatted URL |

FIG. 4

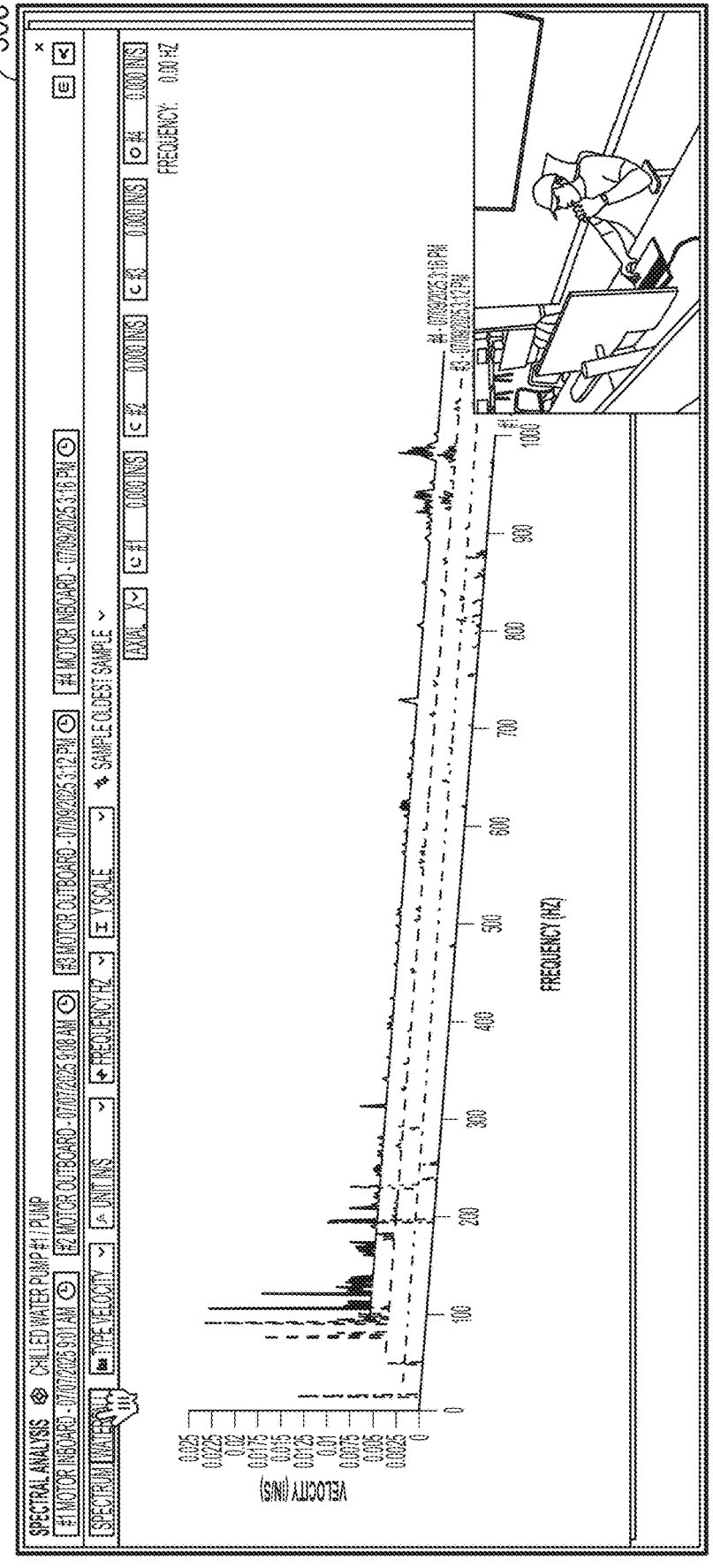
FIG. 5 (Continued 1)

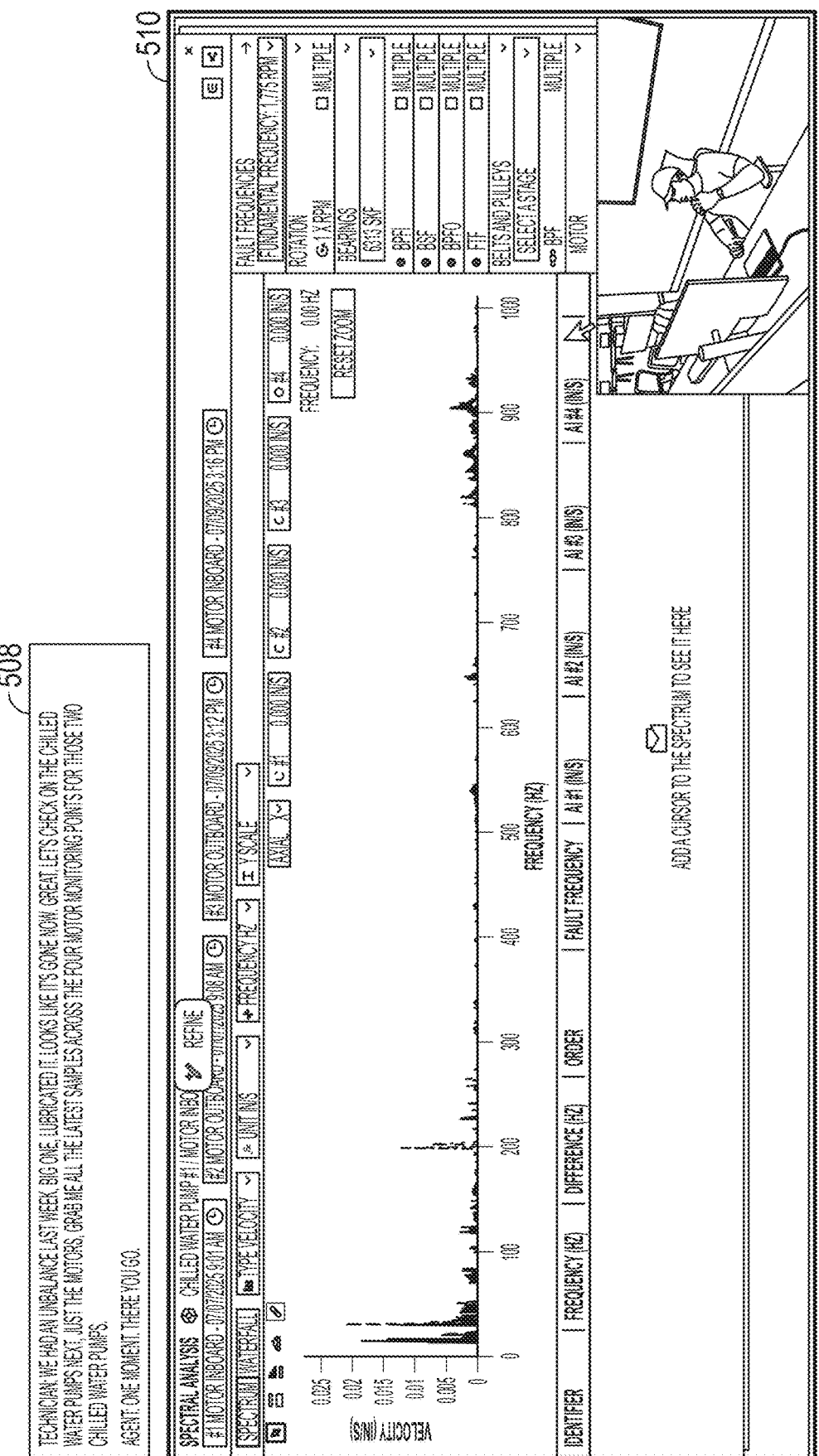
FIG. 5 (Continued 2)

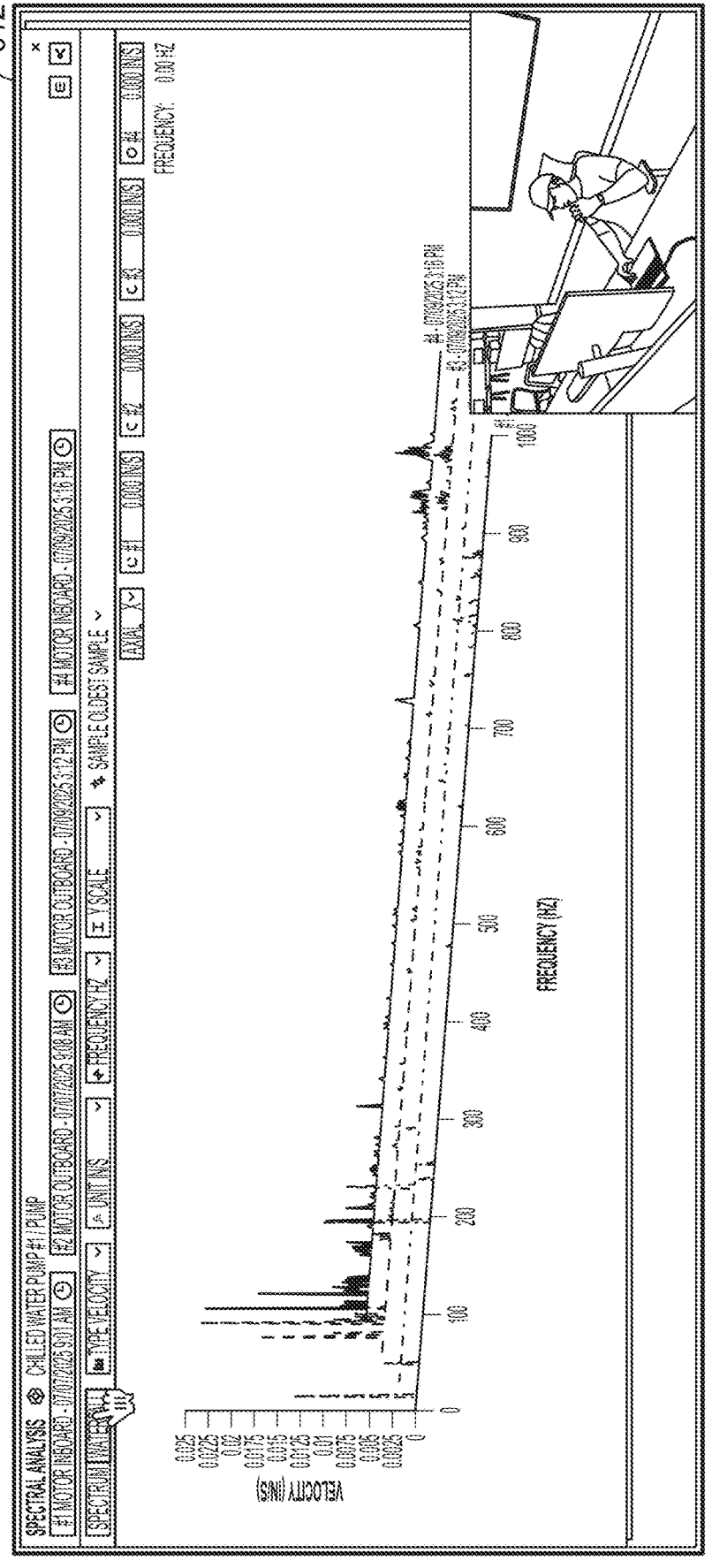
FIG. 5 (Continued 3)

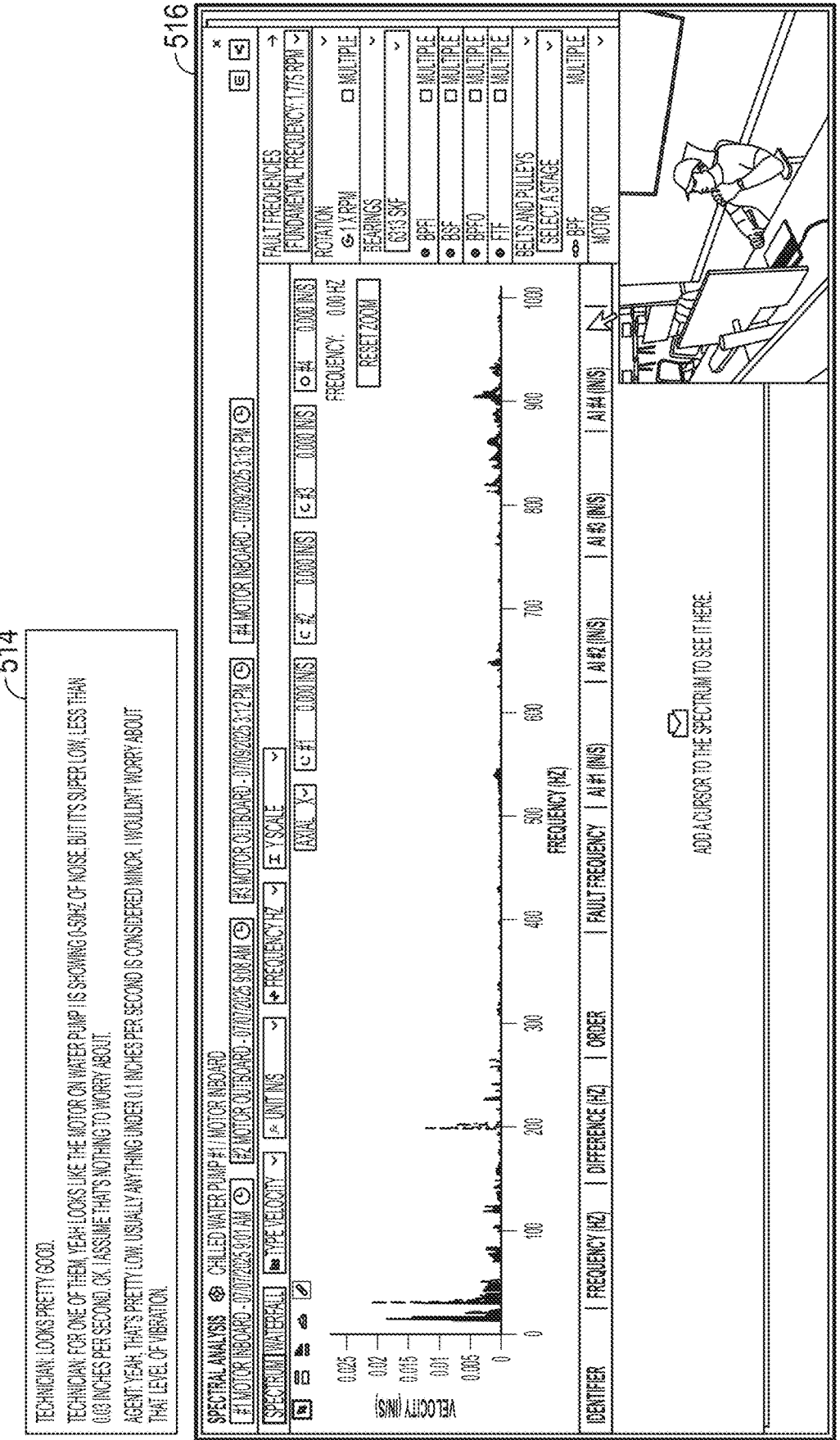
FIG. 5 (Continued 4)

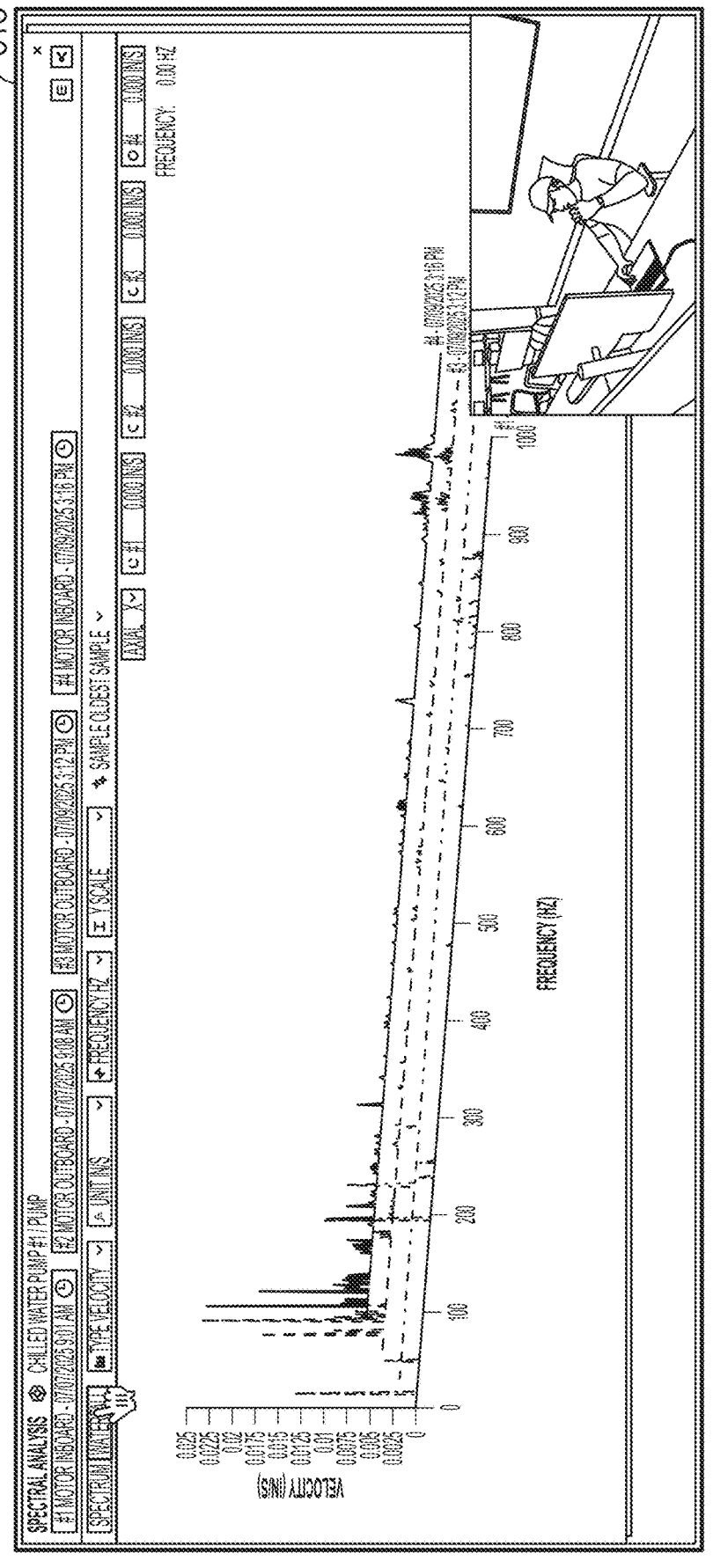
FIG. 5 (Continued 5)

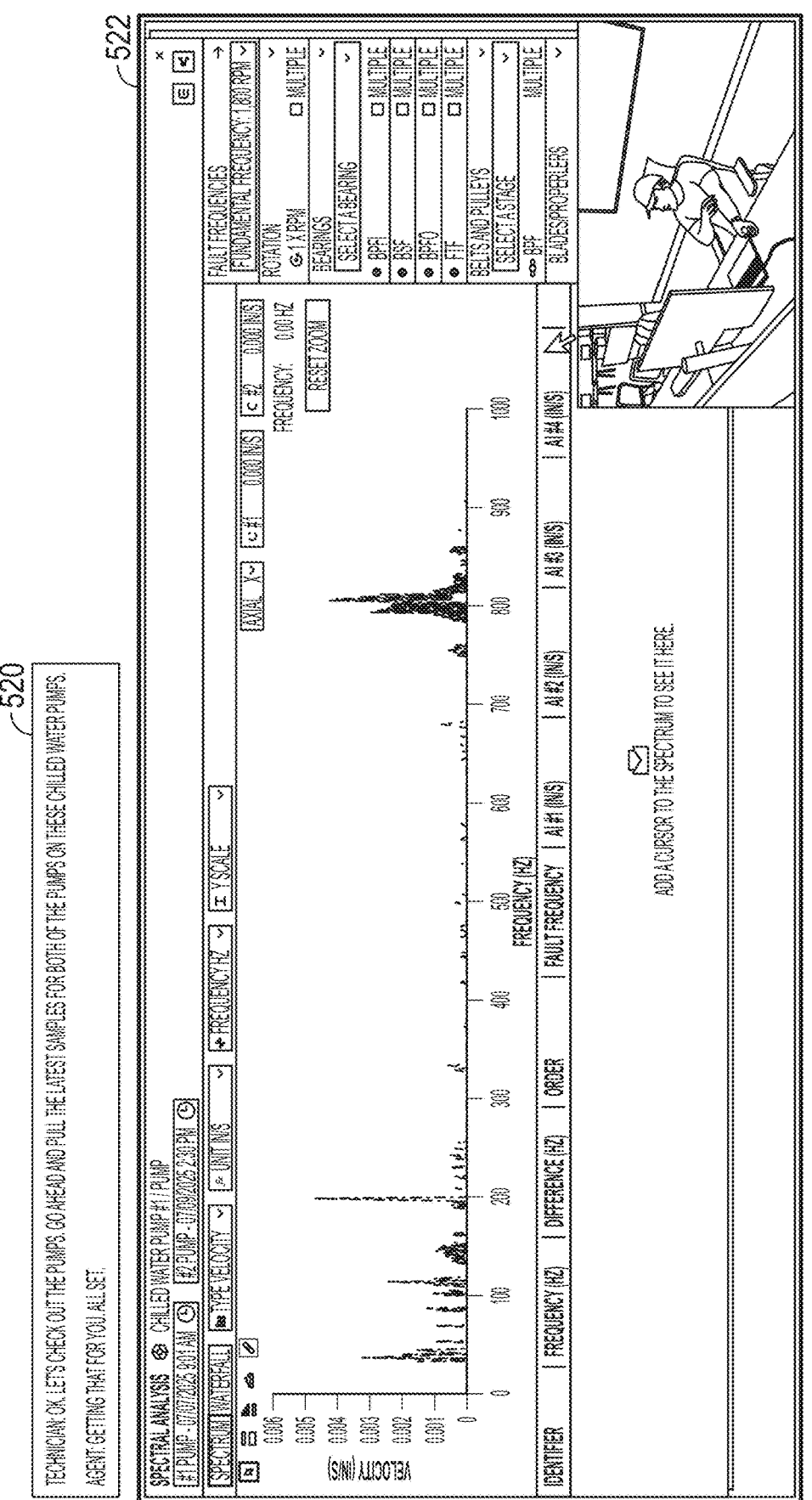
FIG. 5 (Continued 6)

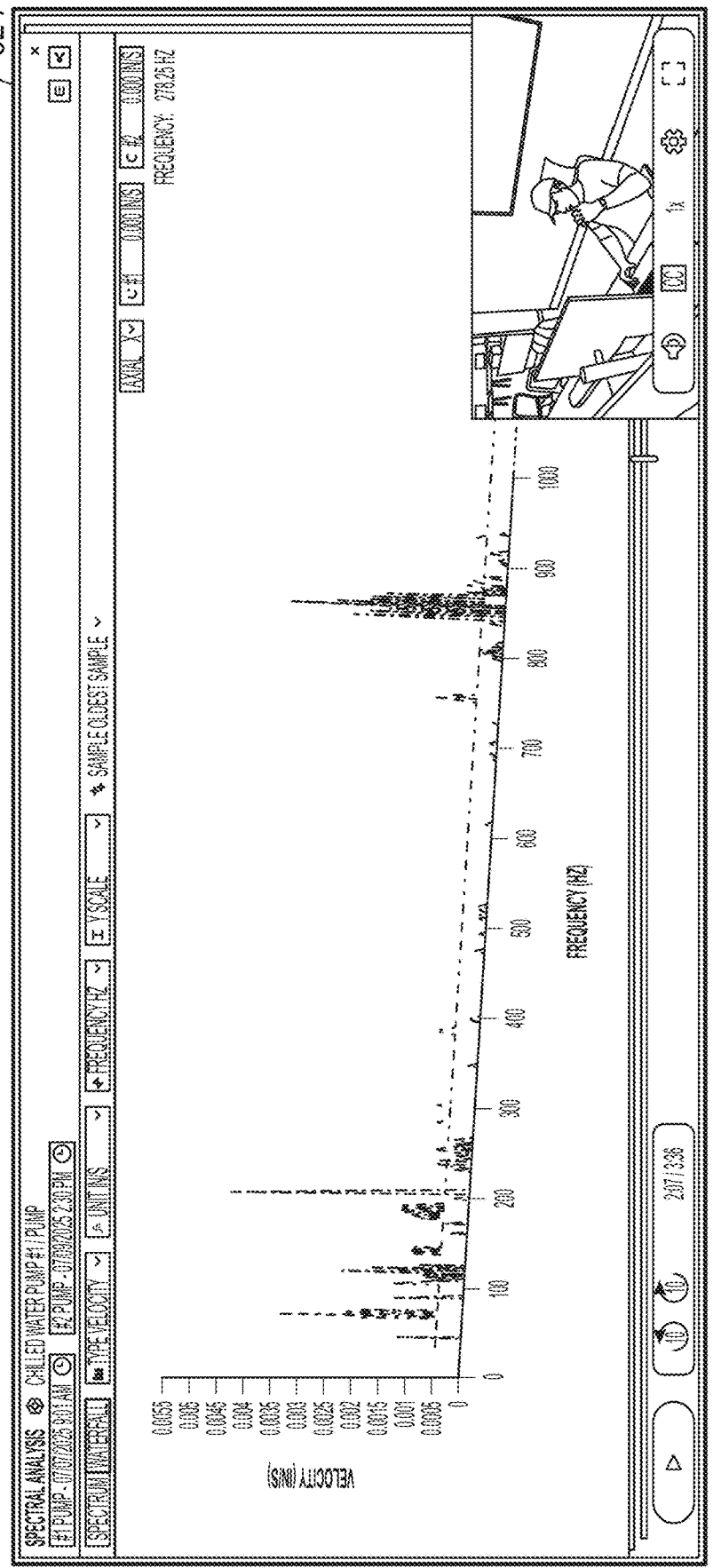
FIG. 5 (Continued 7)

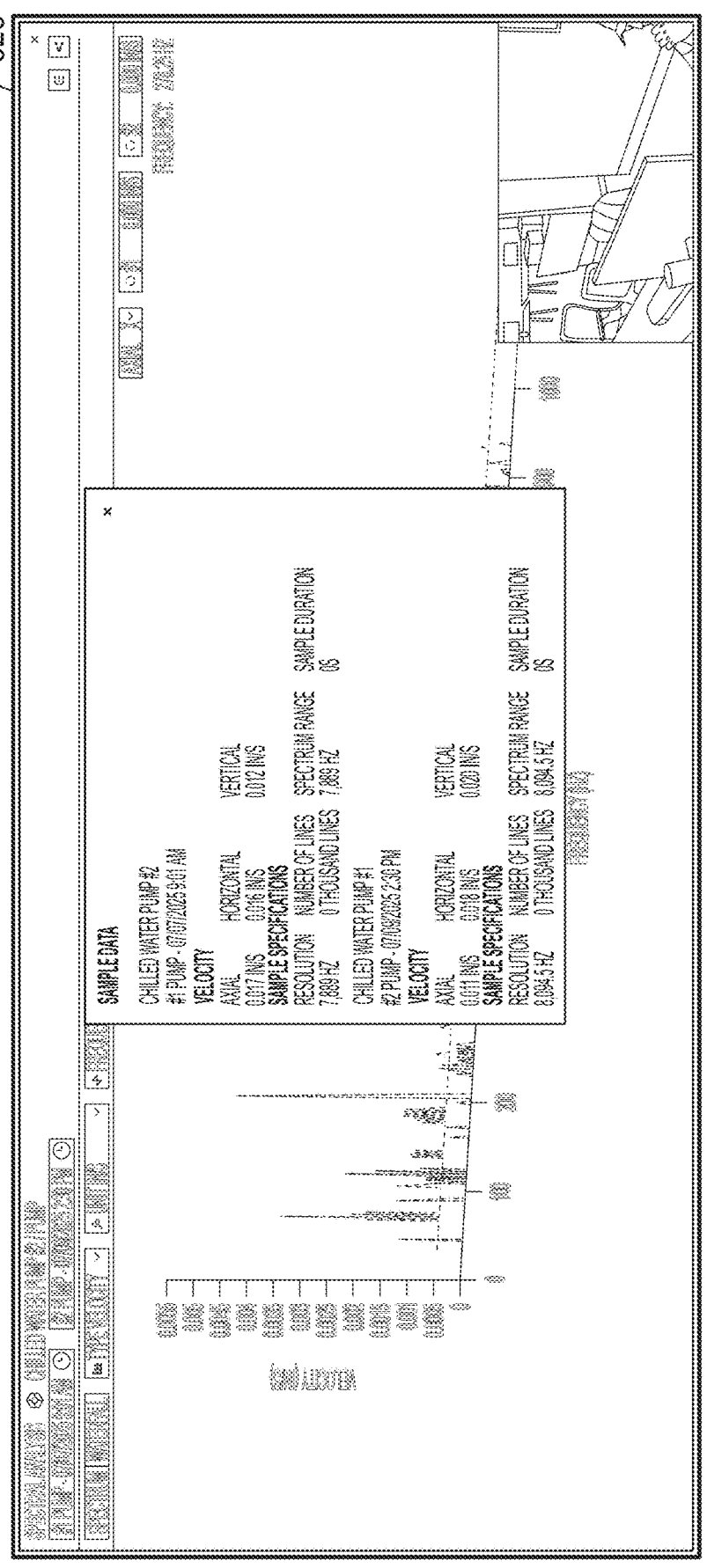
FIG. 5 (Continued 8)

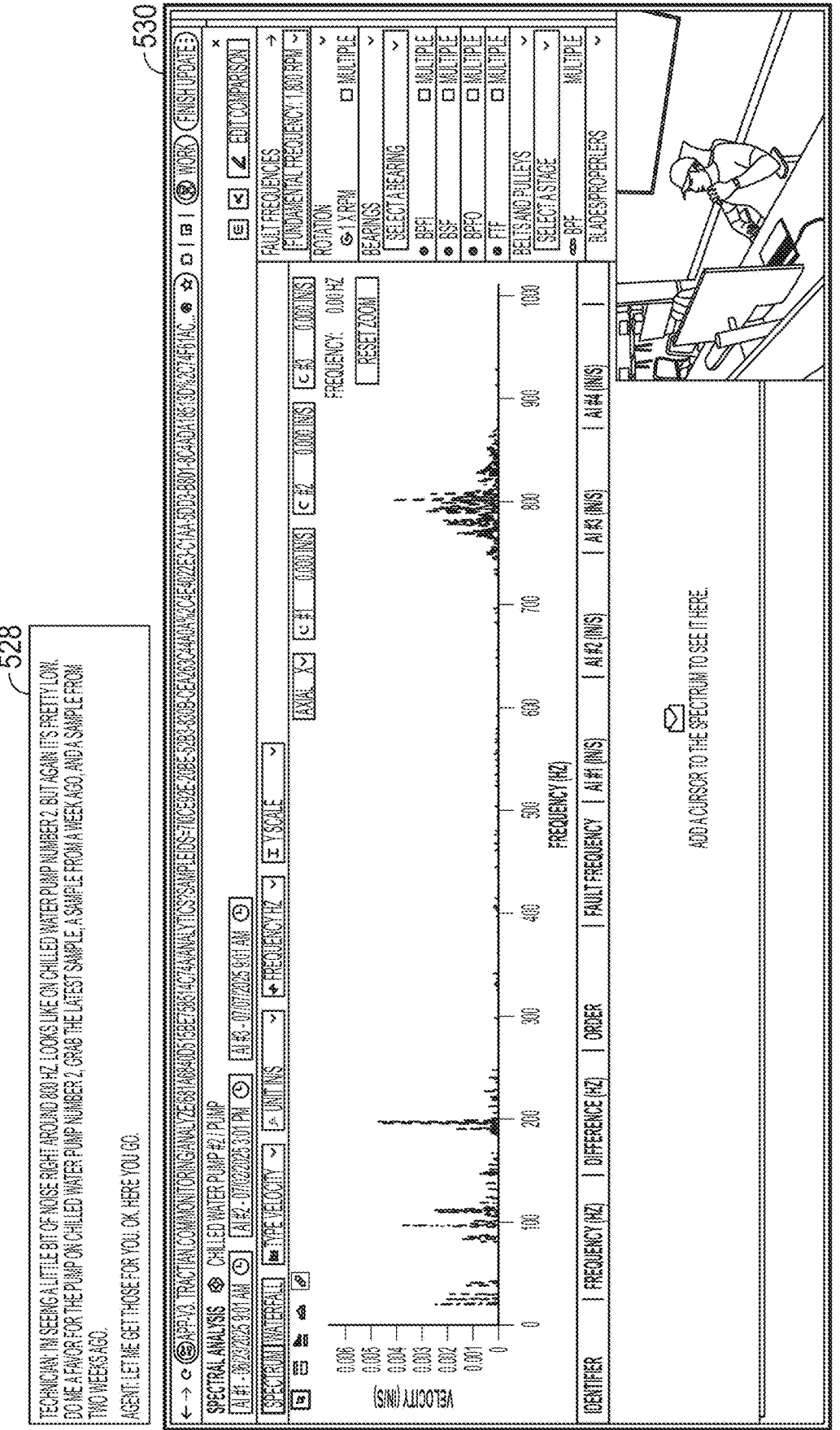
FIG. 5 (Continued 9)

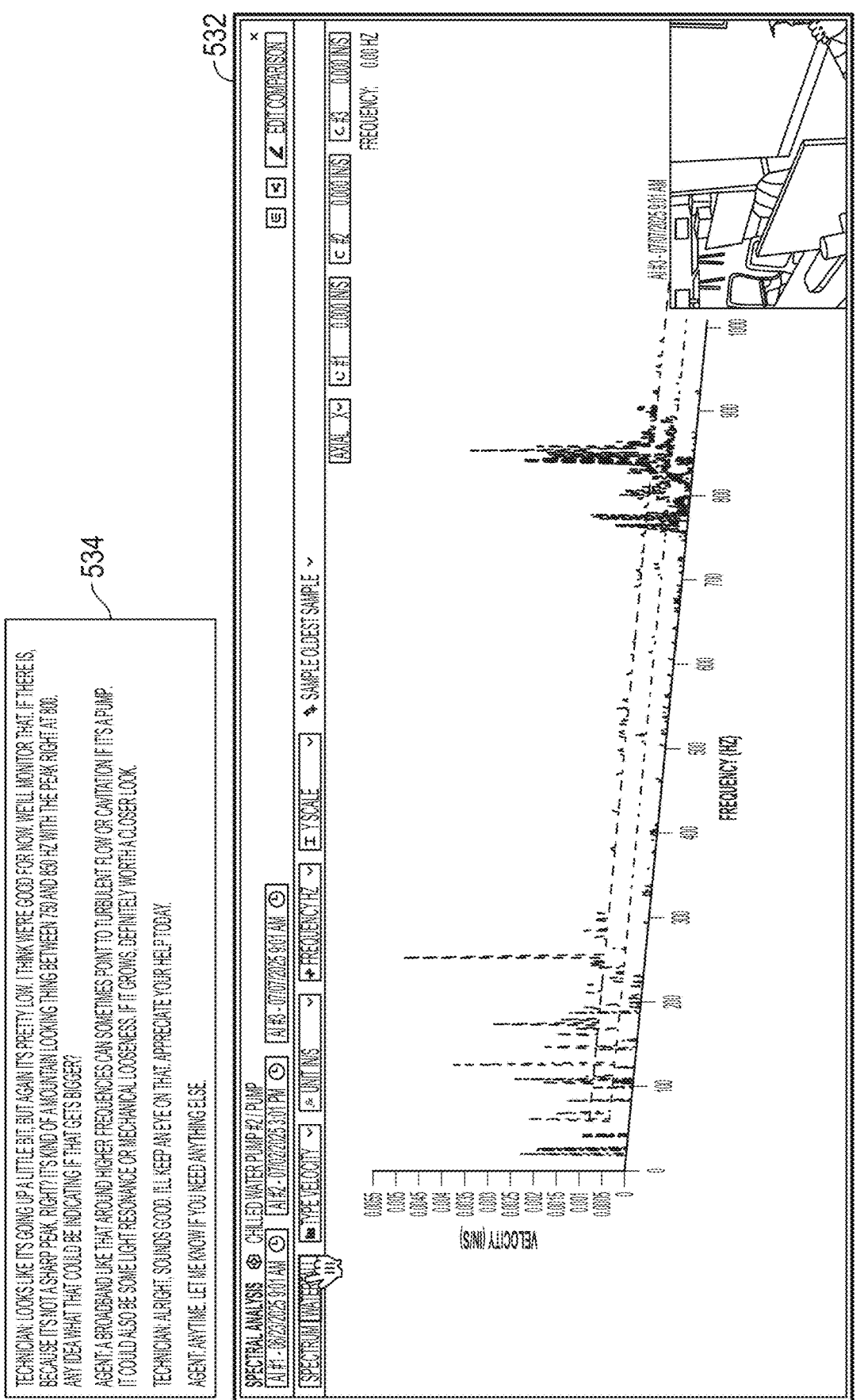
FIG. 5 (Continued 10)

SAMPLE RETRIEVAL AND USER INTERFACE GENERATOR

BACKGROUND

Field

This invention relates generally to the field of artificial-intelligence (AI) and more particularly to AI-based user interface generators in the field of machine monitoring and maintenance.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial plants can include numerous mechanical machines with thousands of moving parts. To increase the efficiency of plant operations, the machines are monitored for maintenance purposes. Monitoring can include a trained technician visually inspecting the machines, observing the machine operations, and listening for any abnormal auditory cues that can indicate a present or potential maintenance-related fault in the machines. The technicians can also perform more sophisticated diagnosis, using maintenance and diagnostic tools. Continuous monitoring of industrial machines can present operational inefficiencies and cost to an industrial plant, particularly as the number of machines can be substantial in an industrial plant. For these and similar reasons, plants or busy shops with mechanical machines can benefit from an automated maintenance infrastructure. The automatic maintenance infrastructure can continuously collect maintenance-related data from various machines, detect maintenance-related events, and recommend appropriate action.

An automatic maintenance infrastructure can take advantage of monitors and receivers that are equipped with wireless communication technology. Despite automation, plants still have incredible talent in the form of maintenance engineers and technicians who would still like to access the collected machine data and samples, despite the available automated maintenance and monitoring tools. Furthermore, the volume of collected machine data in a maintenance and monitoring infrastructure can make it difficult for professional users to efficiently retrieve and build useful and targeted visualizations of the machine data in a plant, via interactive user interfaces. Consequently, there is a need for a robust sample retrieval and user interface generator assistant technology, which can help maintenance engineers in building visualizations to perform monitoring and maintenance in an industrial plant.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

FIG. 4 illustrates a block diagram of some components used in building a visualization frontend, where URL map rules are used.

DETAILED DESCRIPTION

Figure 1A:
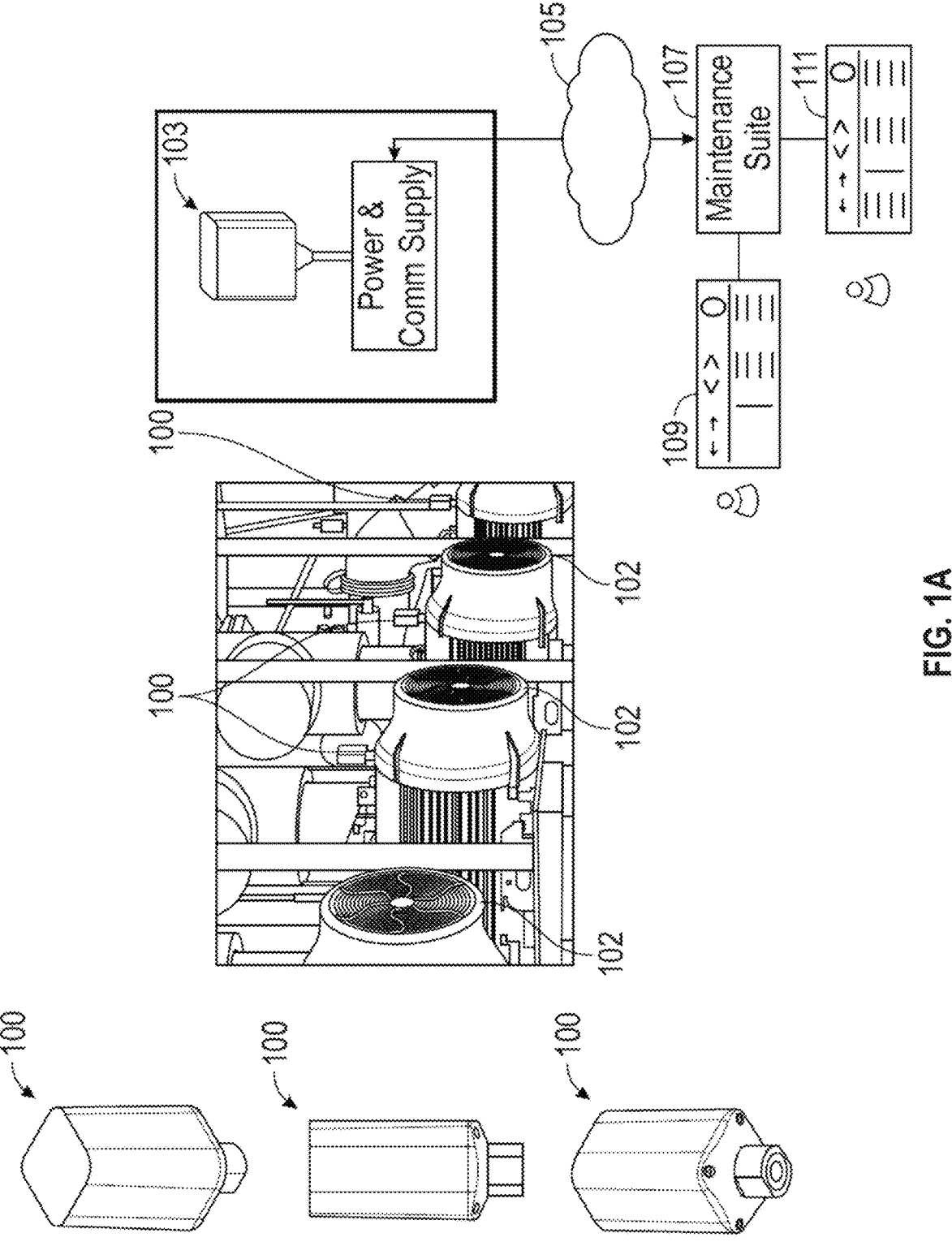
FIG. 1A illustrates example diagrams of a monitor, industrial machines, and an infrastructure of fault monitoring and maintenance operations according to some embodiments.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Industrial machines can benefit from consistent and accurate fault monitoring with artificial intelligence processing of the monitored data. In some embodiments, a plurality of small monitor assemblies, each equipped with wireless communication circuitry, can be attached to various industrial machines in a plant. The monitors can sense and report various operational parameters related to fault monitoring. For example, temperature and vibration can be monitored and reported. The quality of vibrations, vibration trend data and other characteristics can be indicators of fault occurring or developing in an industrial machine. Similarly, temperature and temperature trends of a machine can include indicators of occurring or upcoming faults in the machine.

FIG. 1A illustrates example diagrams of a monitor 100, industrial machines 102, and an infrastructure of fault monitoring and maintenance operations according to some embodiments. The monitor 100 can be battery operated and can include a variety of sensing components enclosed in a housing. The monitor 100 can attach to machines 102 in the plant using a magnetic connection and/or by using other methods of attachment and fastening to secure the monitors 100 to machines 102 in the plant. The attachment of the monitors 100 to machines 102 can depend on the magnitude of the vibrations and other considerations related to the environment of the machines 102 and the plant. For example, if larger magnitude vibrations are expected, the connection between the monitors 100 and the machines 102 can be secured with an adhesive agent, so the monitors 100 can maintain their connections to the machines 102, despite large vibrations.

The monitors 100 can include wireless communication circuitry and can be in wireless communication with one or more receivers 103. In some embodiments, one or more monitors 100 can be modified to be in wired communication with a receiver 103 and have a connection to an outlet source of power. In other words, the source of power and type of communication of the monitors 100 can be modified, depending on the application and the environment of the plant to include any combination of battery-operated, outlet-operated, wired communication, and wireless communication. Similarly, the receivers 103 can include both wired and wireless communication circuitry. The receivers 103 can also be powered with or without the use of a battery. In some embodiments, both the monitors 100 and the receivers 103 can wirelessly communicate to a portable computer, such as a laptop, a smart phone, a smart tablet, or other portable devices, in the field, using a local or cellular wireless network. Although the term receiver is used, the receivers can also send data to monitors 100. Consequently, receivers 103 can be transceiver devices. For example, a receiver 103 can send a configuration file to a monitor 100 to enable, disable or otherwise configure various operating parameters of the monitor 100.

The numbers and locations of the receivers 103 can depend on the size of the plant and then numbers and distances of the monitors 100, relative to the receiver 103 and the wireless communication technology used to communicate between the monitors 100 and the receiver 103. The receivers 103 can be mounted at various locations in a plant and can have connection to a power and a communication source. For example, the receivers 103 in a plant can be in wired and/or wireless communication to one or more communication portals 105. Example communication portals 105 can include a local network, the Internet, one or more cloud infrastructures, gateways, other receivers 105, and other communication midpoints, or endpoints. The receivers 103 can transmit the fault monitoring data for upstream processing. The receivers 103 can also receive various operational configuration files, settings files, and/or other operating parameters and can transmit the operating parameters to the monitors 100. Examples operating parameters can include various timing and frequency of when and how the monitors 100 should collect data from the machines 102.

A maintenance suit 107 can receive monitoring data from the monitors 100 and perform processing related to fault monitoring and maintenance operations on the data. The maintenance suite 107 can include a variety of submodules and databases that can support processing of the monitoring data, including, storage of the data, generating reports from the data, extracting trends from the data, generating fault prediction from the data, generating maintenance action items, tickets, generating alerts, and/or other automated actions related to the maintenance of the machines 102. In some embodiments, the operations of the maintenance suite 107 can include artificial-intelligence submodules that can assist in fault prediction, maintenance recommendation pattern and trend detection, and other data analytics action, augmented or generated by artificial intelligence models. Example artificial intelligence techniques and/or models used by maintenance suite 107 can include neural networks, deep neural networks, machine learning, convolutional neural networks (CNNs), random forests, and others.

The maintenance suite 107 can support a variety of user interfaces (UIs). For example, the maintenance suite 107 can support a frontend user interface 109 and a backend user interface 111. Various parameters related to the operation of the monitors 100 can be viewed and/or modified via the user interfaces 109, 111. The user interfaces 109, 111 can provide access for a user to generate or modify configuration files, settings and operating parameters for the monitors 100 and the maintenance suite 107. The users can also view the output of the maintenance suite 107 via the user interfaces 109, 111.

While not shown, the monitors 100 are not the only maintenance-related in-field components operated by the maintenance suite 107. Other components associated with monitoring and maintenance of the machines 102 and the plant can also be in communication with the maintenance suite 107. For example, in some embodiments, energy management components in communication with the maintenance suite 107, can monitor the power consumption of the machines 102 and their plant.

Depending on the size of an industrial plant, the monitors 100 can be numerous, for example in the hundreds or thousands. The maintenance suite 107 can streamline and track data from hundreds or thousands of machines and automate the identification and tracking of maintenance-related tasks for a large industrial plant, having hundreds or thousands of machines.

Figure 1B:
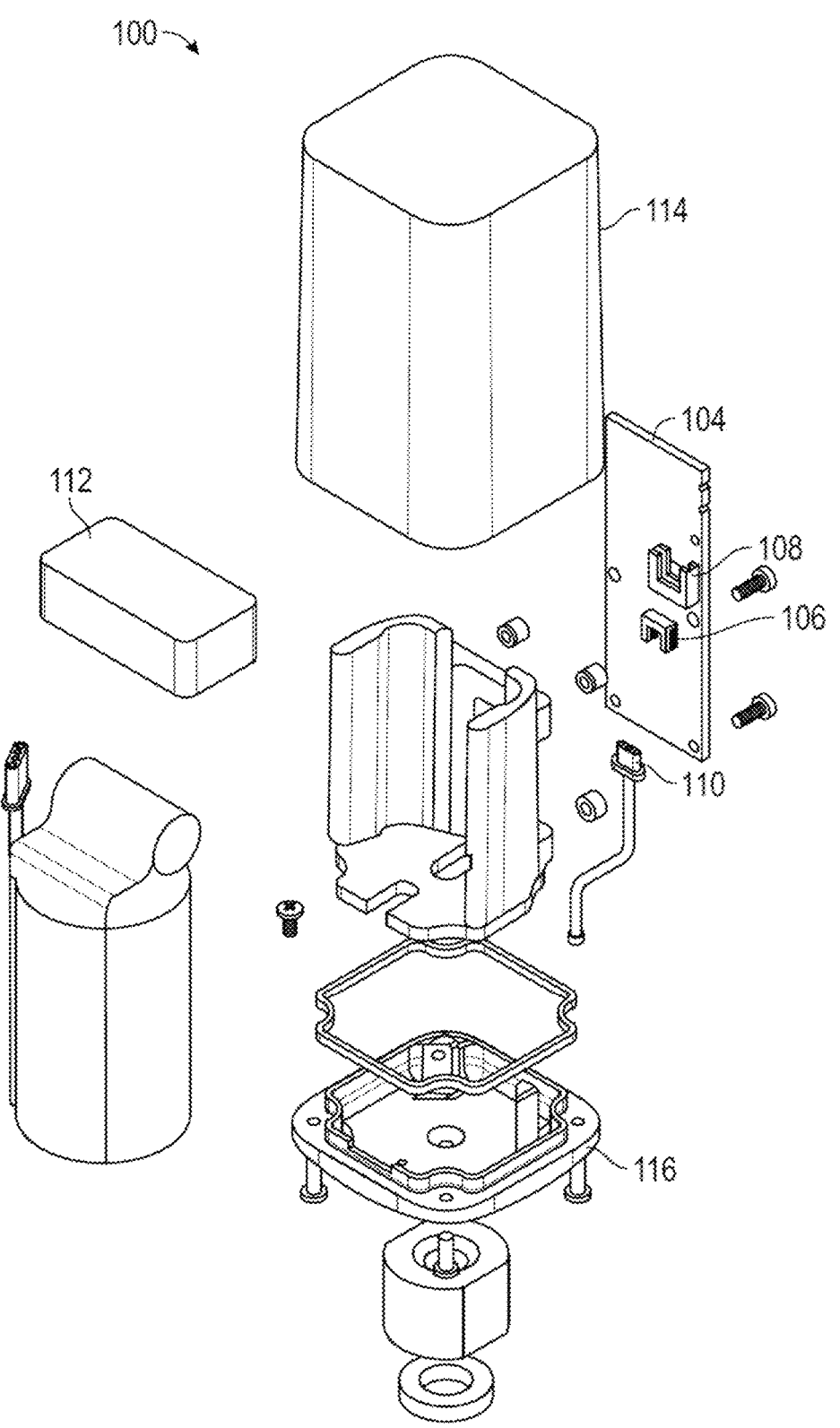
FIG. 1B illustrates an exploded view of the monitor of the embodiment of FIG. 1A.

FIG. 1B illustrates an exploded view of a monitor 100. Some example components include the printed circuit board (PCB) 104, the microcontroller 106, an accelerometer 108, a temperature sensor 110, a battery module 112, various spacers, holders, internal conduits, and a housing 114. The housing 114 can house the internal components of the monitor 100. A housing lid 116 can enclose the housing 114 and seal the internal components of the monitor 100 from the outside. The monitor 100 can be made water-, dust- and particle-resistant by a variety of techniques. For example, in some implementations, the monitor 100 can be resin-coated. The battery module 112 can include one or more lithium-ion batteries, and a battery management system (BMS). In other embodiments, the BMS can be external to the battery module 112, for example, it can be mounted on the PCB 104. In some embodiments, the life expectancy of the battery module 112 can be between three to five years.

The monitor 100 can include communication circuitry, corresponding to the communication circuitry of one or more receivers, for example, the receivers 103, and one or more local, private and/or public communication network, including one or more cellular networks. The choice of network and communication circuitry can depend on the size of the plant and the distance of the monitor 100 from a receiver 103. The communication circuitry of the monitor 100 can be mounted on the PCB 104. In some embodiments, the communication circuitry may be integrated in the micro-controller 106. Similarly, in other embodiments, various components can be combined into one or use a component that integrates several components together. The monitor 100 can include a magnetic collar to provide magnetic attachment between the monitor 100 and the machine 102. In some embodiments, the temperature sensor 110 can be routed to a surface very near the point of contact between the monitor 100 and the machine 102 to provide a more accurate reading of the temperature of the machine 102.

The accelerometer 108 can be a micro-electro-mechanical system (MEMS) accelerometer, capable of one, two, or three axis acceleration data. For example, in some embodiments, the accelerometer 108 can measure forces in three directions along the XYZ axes. The accelerometer 108 can measure and transmit both magnitude and spectral data of the vibra-tions of a machine 102 to the microcontroller 106.

The microcontroller 106 can be a collection of various components, including computer or computing components. Example components of the microcontroller 106 can include a processor, such as a central processing unit (CPU), per-manent and impermanent memory, including for example, random access memory (RAM) of various kinds, solid state, flash or other permanent memory, interconnects, buses and communication vias between the various components. In some embodiments, the microcontroller 106 can include external communication circuitry to enable wireless com-munication, including radio frequency identification (RFID), Bluetooth, cellular, or other communication tech-nologies. In other embodiments the monitor 100 can include dedicated wireless communication circuitry, fabricated or included in the monitor 100, in a separate component than the microcontroller 106.

The monitors 100 can be configured to spend the majority of their time in hibernation state to conserve battery power. In hibernation mode, the power to all or some of the components of the monitor 100 can be reduced or mini-mized, thereby reducing the overall battery consumption in the hibernation state. The monitors 100 can be configured to periodically exit hibernation mode and enter normal opera-tion mode, where power and functionality to some or all components is restored. For example, the monitors 100 can perform periodic sampling of various operational param-eters of the machines 102, such as temperature and vibra-tions. When scheduled sampling is not performed, the moni-tors 100 can be in hibernation mode.

The monitors 100 can perform a variety of samplings of machine operation parameters. For example, for the vibra-tion parameter of the machines 102, the monitors 100 can perform various samplings at different intervals and with different characteristics. Example sampling characteristics can include sampling intervals, sampling frequency, sam-pling rate, sampling range, sampling resolution and other characteristics. Sampling interval can refer to the period by which the monitor 100 turns ON and performs a sampling with a selected set of sampling characteristics. In some embodiments, the monitors 100 can be configured to per-form scheduled sampling sessions, which are samplings performed at selected intervals. The selected intervals can depend on the type of machines 102 and other factors that are application-dependent, based on where the monitors 100 are used. Example sampling intervals can include sampling with intervals separated by minutes, hour or hours, days, or even months, and other intervals.

The monitor 100 is a battery-operated device. In most applications extending the longevity of the monitor 100 is proportional to the longevity of the battery module 112. A significant portion of the battery consumption of the monitor 100 relates to the transmission of data to the receiver 103. At the same time, typical industrial environment of the monitor 100 and the receiver 103 can present challenges for wireless transmission of data between the two devices. For example, industrial environments can introduce substantial noise and interference to wireless transmission of data between the two devices. Various wireless communication frameworks exist and can be utilized for transfer of data. A wireless communication framework can provide a basic level of functionality between transmission nodes. Referencing the open systems interconnection (OSI) model, various existing wireless communication frameworks can provide some of the functionality for wireless transmission of data between a monitor and a receiver. For example, an existing wireless communication framework can provide a physical layer for wireless transmission of data between the monitor and the receiver, using radio waves.

The monitor 100 is but one device, which can be used in a maintenance and monitoring infrastructure. Other devices may also be used. For example, some industrial machines 102 can include an integrated sensor, which reports on the operational parameters of the machine.

Regardless of what type of monitoring device is used, an industrial plant may have a collection of monitors that repot machine data upstream. Various technicians or automated models can utilize the machine data for different analysis and maintenance and monitoring tasks. For example, vibra-tion technicians can utilize the machine data for generating various comparative spectrum analysis graphs to glean insight as to the conditions of a monitored machine. Often in the environment of an industrial plant, where monitor 100 and similar devices are deployed, there can be a massive volume of machine data. It can be time consuming and difficult for a technician to manually generate the various graphs and user interfaces that can be useful for maintenance analysis. Consequently, there is a need for more systems and methods that cannot automatically identify and retrieve relevant sample machine data, but generate user interfaces and displays geared toward a technician's interest. The automated systems and methods of sample retrieval and user interface generation can, in some embodiments, provide assistive analysis, while in other embodiments, the techni-cians are the expert in analyzing the user interface and graphs, generated based on samples, and thus can be more interested in efficiently obtaining their selected graphs, based on samples that are automatically retrieved by an assistant agent.

An automated sample retrieval and task performer (SRTP) can allow a technician, for example, a vibration analysis technician, to use voice or text and request various graphs of machine samples. In one embodiment, a technician can engage in a conversation with the SRTP and use phrases, such as "Let's check on the chiller pumps. Grab me the latest samples." The SRTP can identify a machine or asset referenced in the conversation, retrieve the relevant samples, generate a spectrum analysis graph and display that to the technician.

Figure 2:
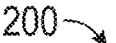
FIG. 2 illustrates a block diagram of an example automated sample retrieval and task performer (SRTP), according to an embodiment.

FIG. 2 illustrates a block diagram of an example automated sample retrieval and task performer (SRTP) 200, according to an embodiment. A user, for example a technician 202, can interact with the SRTP 200, via voice, text or other input. A primary agent include a primary agent 204. The primary agent 204 can be implemented with a large language model (LLM). The primary agent 204 when configured and prompted can process a user request and determine one or more relevant assets in an industrial plant, which can be the subject of the user request. The primary agent 204 also identifies what task is embedded in the user request. Example tasks include those demanding some type of visualization of samples or functional tasks, for example, setting reminders, alerts or assigning duties, based on the user request.

The primary agent 204 can have a catalog of secondary agents 206, or helper agents, which can also be implemented with LLMs. The secondary agents 206 can be considered tools of the primary agent 204 and are configured and prompted for performance of a task. The primary agent 204 is also responsible for determining which secondary agents 206, based on the user request, can be deployed to respond to the user request.

One or more data servers 208 of the maintenance and monitoring infrastructure may include and continuously be populated with samples or machine data from monitors 100, integrated sensors of the machines 102 or other monitoring devices. The primary agent 204 maintains a catalog of its available secondary agents 206, their functionality and their input sample profile. Based on the user request, the primary agent 204 can deploy a corresponding secondary agent 206. Some of the secondary agents 206 can be LLMs that are configured and prompted to gather a selection of the samples from data servers 208. For example, a secondary agent 206 can be configured and prompted to gather "the latest" samples. Another secondary agent 206 can be configured and prompted to gather historical samples of an asset. A secondary agent 206 can be configured and prompted to gather latest samples from multiple assets. Yet, other secondary agents 206 may be directed to tasks, unrelated to samples.

The primary agent 204 can receive the output of one or more secondary agents 206 and perform one or more corresponding tasks. Examples of corresponding tasks include generating a visualization frontend 210, and performing a function 212. Examples of functions 212 can include configuring one or more monitors 100 and/or other monitoring devices, interfacing with an industrial machine 102 or an integrated sensor of an industrial machine 102, and assigning tasks, reminders, alarms, or interfacing with a human technician 210.

In the area of vibration analysis, when technicians suspect a developing problem or want to see if a problem has been addressed, they perform various comparisons, typically using a spectrum graph, a waterfall spectrum graph or similar visual aids. Since an industrial plant can include many of the same or similar assets, vibration analysis technicians are typically interested in comparing samples from one asset to the same or similar assets in the same industrial plant. Manual vibration analysis systems can be efficiently used, in part because their data collection is sparse, compared to the data collection of the maintenance and monitoring infrastructure described above. Manual vibration analyzers collect data for a quarter, while an infrastructure using monitors 100 and similar devices can collect data by the minute, hourly, daily, weekly and in general in many orders of magnitude larger than what the manual vibration systems collect. It can be more efficient for a vibration analysis technician to manually generate visualizations for a sparse collection of samples (e.g., a quarterly collection of samples). The SRTP 200 can be utilized to efficiently generate a visualization frontend 210 for vibration analysis, where a technician can request samples from various assets and from different time frames, superimpose them in a visualization (e.g., spectrum graph, trend graph, waterfall graph, etc.) to glean insight as to the status of a maintenance problem or to diagnose one. Vibration analysis, relevant sample retrieval and visualization generation, however, are only example functionalities. The SRTP 200 can be configured to perform other tasks in similar manner as will be described in relation to vibration analysis. In other words, while SRTP 200 is described as a vibration analysis assistant, it can be configured to perform other assistive or analytic functions in the same manner.

Figure 3:
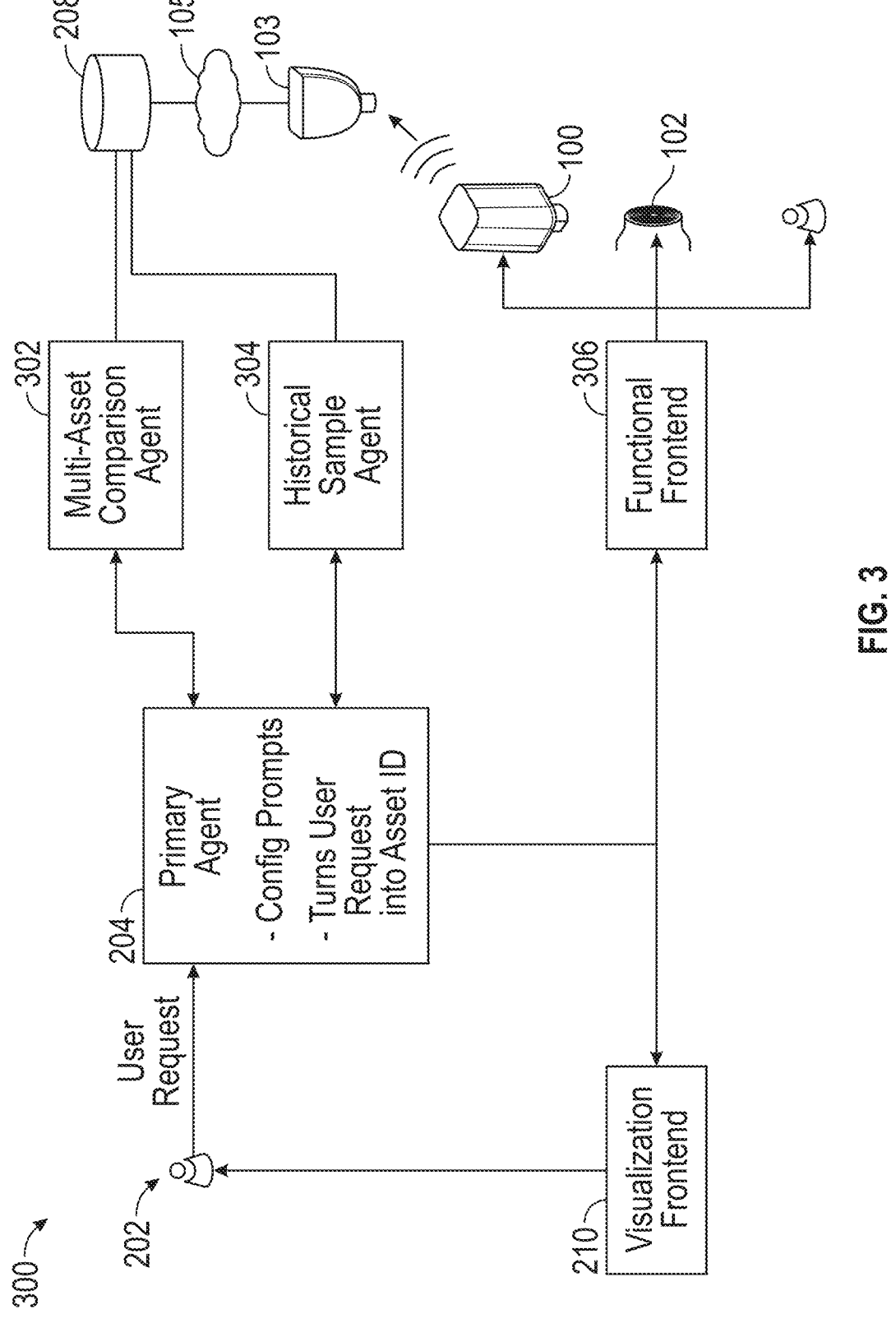
FIG. 3 illustrates a block diagram of a sample retrieval and task performer (SRTP), where the SRTP is featured to be an assistive vibration analysis agent.

FIG. 3 illustrates a block diagram 300 of a sample retrieval and task performer 200, where the SRTP 200 is featured to be an assistive vibration analysis agent. In this configuration, the SRTP 200 can include the primary agent 204. In one embodiment, the primary agent 204 can be an LLM-based voice-enabled agent to which the user 202 can engage in a conversation about an asset, multiple assets, their corresponding samples of different time frames. The primary agent 204 can also be implemented as an LLM-based text-enabled agent. When a user request includes a vibration analysis request, for example retrieving samples for an asset or multiple asset, along with a selected time frame, the primary agent 204 can recruit, load or otherwise cause one or more corresponding secondary agents to execute. For example, depending on the user request, the primary agent 204 can send instructions to a multi-asset comparison agent (MACA) 302 and/or a historical sample agent (HSA) 304. MACA 302 can be an LLM-based agent, configured and prompted to retrieve samples from multiple assets for a given time frame. For example, MACA 302 can obtain "the latest" samples of "chiller pumps" in an industrial plant, from a data server 208 and provide the samples to the primary agent 302. The HSA 304 can obtain historical samples of the same asset from the data servers 208 and provide them to the primary agent 204. The primary agent 204 can generate instructions for a visualization frontend 210 to generate a graph, table, or other user interface, responsive to the user query. Examples of visualization frontend 210 can include various frequency spectrum graphs, trend graphs, waterfall graphs, multiple asset spectrum profiles superimposed or any other user interface element requested by the user 202. The visualization frontend 210 is interactive and the user can view it on a computer display and interact with the display via keyboard, mouse, voice commands, or other input methods. The primary agent 204 can also generate instructions for a functional frontend 306, which can include instructions for configuring or reconfiguring one or monitoring devices (such as monitor 100), an industrial machine 102 or an integrated sensor of an industrial machine 102, or instructions populated in a profile of a technician (e.g., assigning a task to the technician, such as reminding the technician to monitor a suspected fault in an asset, and so forth). Functional frontend 306 instructions can include setting up threshold, alarms, reminders or other maintenance-related actions. The primary agent 204 can further be instructed, for example by providing it with LLM prompt examples, to identify a task in the user request, which can include translating or mapping of a user's conversational or colloquial mentioning of a task to a concrete task performable by the primary agent 204 and/or the secondary agents 206. The primary agent 204 can be instructed to generate computer instructions corresponding to the identified task and to communicate the generated computer instructions to one or more computer systems of the maintenance and monitoring infrastructure. At the same time, the monitoring devices, such as monitors 100 are in wired or wireless communication with the maintenance and monitoring infrastructure, for example, through the receiver 103, communication portals 105. They populate machine data and machine samples in the data servers 208. The samples can be extracted or retrieved by secondary agents, such as MACA 302 and HSA 304.

Configuration and prompting of the primary agent 204 can include LLM instructions, for instantiating an agent as "an assistant," as well as providing the primary agent 204 with an asset tree of an industrial plant. An asset tree includes a listing of all assets (machines) of an industrial plant, which are monitored by the maintenance and monitoring infrastructure, their relationship with one another (e.g., whether they are part of a larger parent asset, etc.), as well as asset identifiers (asset IDs) that uniquely identify each asset in an industrial plant. The LLM instructions for the primary agent 204 includes instructions to "correlate a verbal, conversational user request to a concrete asset, by identifying the asset ID, which is the subject of the user request." The LLM instructions can further include an instruction to "ask clarifying questions if the subject asset is unclear or there are multiple matching assets to an asset referenced in the user request." The primary agent 204 provides the asset IDs to the secondary agents, such as MACA 302 and/or the HSA 304. Part of instantiation of the primary agent 204 also includes a listing of all the secondary agents available to it. In other words, the LLM instructions for the primary agent 204 includes a listing of secondary or helper agents, which it can utilize in constructing a response to the user request.

MACA 302 can be constructed with an LLM. The configuration and prompts for the MACA 302 includes "receive asset IDs and interface with a sample provider endpoint of the maintenance and monitoring infrastructure." The sample provider endpoint can be embedded in or in communication with the data server 208. The sample provider endpoint can receive an asset ID and a time range and provide all samples that have the asset ID label and satisfy the time range. In one implementation, the MACA 302 can be configured and prompted to obtain the "latest samples," which can be a selected or configurable parameter. For example, in some implementation, the latest samples can be configured to be samples from a year ago up to the present time.

The primary agent 204 can extract a requested time frame from the user request. The user request can be in a conversational format. The primary agent 204 includes LLM instructions to turn the conversational references to a time frame into a more concrete format, for example, by identifying date and time stamps corresponding to a verbal or conversational user request. The primary agent 204 communicates the time frames or date ranges, extracted from the user request, to the HSA 304.

HSA 304 includes LLM instructions to translate the time or date ranges received from the primary agent 204 into available sample time stamps, via precise time window matching or by making approximation to find a fit between the sample time stamps and the requested time frame. In other words, the HSA 304 includes LLM instructions to match the time frame in a user request (received from the primary agent 204) to an available range of samples, having exactly or approximately the same time frame as indicated in the user request.

In some embodiments, the primary agent 204 can include LLM instructions to answer user questions regarding sample analysis, for example, whether an artifact in the spectrum can be indicative of a particular machine failure. In other embodiment, the user might be a professional vibration analysis technician and might turn off the feature of analysis and recommendation, and use the primary agent for generating the visualizations of sample data that the technician can use to perform their own analysis.

The combination of the secondary agents, MACA 302 and HSA 304, can enable a vibration technician to retrieve the type of samples and time ranges that a vibration analysis technician typically relies on for diagnosis and monitoring. For example, industrial plants can include many of the same or similar assets. Maintenance technicians are typically interested in sample retrieval and visualizations that allow them to compare samples from one machine to another, in order to highlight anomalies. Furthermore, analyzing a progression of a maintenance problem (whether improving, stable or worsening) can be accomplished by analyzing samples from the same asset, over various selected time frames. For example, in trying to answer questions such as "when did the problem start," "has the problem been the same for the past 3-4 weeks," "is the problem getting worse," "was the solution introduced two weeks ago effective," and similar ones, the maintenance technician is typically interested in quickly and efficiently retrieving samples relevant to these conversational time periods and generating a corresponding visualization of the retrieved samples (e.g., a trend graph, a spectrum graph, etc.). The SRTP 200 and its agents can efficiently identify assets and asset IDs, retrieve relevant samples and generate the requested visualization.

The operations of MACA 302 and HSA 304 provide the primary agent 204 with relevant samples, which the primary agent 204 can use to build the visualization frontend 210. The primary agent 204 can be configured and prompted with LLM instructions to build the visualization frontend 210. As part of the LLM instructions, the primary agent 204 can be provided with example user interfaces, graphs and visualizations that the LLM can learn to model. Various techniques can be used in building the visualization frontend 210.

FIG. 4 illustrates a block diagram 400 of some components used in building the visualization frontend 210, where URL map rules 408 are used. Secondary agents, such as MACA 302 and HSA 304 provide sample IDs 402 of asset IDs 404 to the primary agent 204. The primary agent 204 includes LLM instructions 406 for generating a visualization frontend 210. In one embodiment, the primary agent 204 can build the visualization frontend 210 via a layered uniform resource locator (URL). In this scenario, the primary agent 204 can be instructed with a set of URL map rules 408. The URL map rules 408 can include rules for constructing a URL, that when accessed or executed by a browser, can generate a user interface visualizing the samples. Also in this scenario where the visualization frontend 210 is built with layered URLs, the primary agent 204 acquires sample IDs 402 as opposed to the underlying samples. In this manner, when a visualization URL is built, the URL includes the asset IDs, which the browser can use to obtain the underlying samples from a data server 208.

The URL map rules 408 can be constructed in a variety of ways. An example URL map rule 408 is shown in table 410. In this example, the URL map rules 408 are organized based on the number of assets underlying the requested visualization. For example, for a single asset, various default single asset URLs corresponding to various visualizations can be listed (e.g., trend graph, spectrum view, etc.). Another instruction in the URL map rule 408 can include a URL format for comparing samples from multiple assets. The instructions can include where in the URLs an asset ID and sample ID can be placed to cause the browser to retrieve the relevant samples and generate the selected display, graph, visualization or user interface. Another instruction in the URL map rule 408 can include a default or example multiple asset comparison visualization (MACV) URL, which the primary agent 204 can model to generate a visualization when comparing multiple assets. The instruction for MACV URL can include instructions for where to place the asset IDs and sample IDs to construct the MACV URL.

The URL map 408 can include instructions for generating a single asset visualization. The instructions can include where in the default or example URL to place the asset ID and the sample ID (e.g., append asset ID to the URL in location #within the URL, append sample ID to the URL in location #within the URL, reload the formatted URL in the browser window). Another instruction in the URL map rule 408 can include how to format a multiple asset comparison visualization URL or MACV URL. The instructions in this scenario includes a default or example MACV URL, and locations, within the MACV URL, in which asset IDs and sample IDs can be placed. In some embodiments, a multiple asset comparison visualization URL is built on a single asset visualization URL by appending additional asset IDs and sample IDs to the single asset visualization URL. In these embodiments, a single asset can be selected as the root asset and a single asset visualization URL can be constructed. To generate a multi-asset comparison visualization, the asset ID and their corresponding sample IDs of additional assets can be appended to the single asset visualization URL. In other words, a layered URL can be constructed to add more asset comparisons by appending asset IDs and their corresponding sample IDs to a single asset visualization URL.

In one respect, the primary agent 204 includes LLM instructions to use one or more asset IDs and associated sample IDs to construct a command that when executed by a computer system and/or a browser running on a computer system can generate instructions for building a user interface visualization of the samples referenced by the sample IDs (the underlying samples referenced by the sample IDs may reside on a server, such as the data server 208), which the computer system and/or the browser, upon executing the user interface instructions can access and use to build the user interface visualization. The URL method of building the user interface visualizations are but one example. In other embodiments, a frontend code can be provided to the LLM to generate the user interface visualizations, directly. In other words, in some embodiments, the LLM instructions for generating visualizations 406 can include user interface frontend code that directly builds and manages the visualization frontend 210.

In one respect, the described embodiments present an improvement in the technology field of search, identification and retrieval of relevant data from a voluminous collection of sensor data, in an industrial environment. Conventional maintenance systems in such environments typically only present a small collection of machine sample data to a maintenance or vibration analysis technician. For example, machine samples collected quarterly, annually or at similar intervals with relatively low collection frequency are gathered and presented in conventional systems. In this scenario, the overall volume of data remains manually manageable by a human technician. In the context of the infrastructure of the maintenance and monitoring infrastructure, utilizing hundreds of the monitors 100, efficient search, identification, retrieval and presentation of machine data, sometimes collected every minute, every ten minutes, or every fifteen minutes, over a period of one year can present challenges for the conventional systems. Efficient search, identification, retrieval, and presentation of relevant data, using the conventional system designed for processing low volume machine data, can be difficult or impractical. The sheer volume of sensor data can be overwhelming to a human technician, without the benefit of the embodiments described herein.

At the same time, significant insights regarding maintenance, diagnosis and monitoring of potential issues can remain unexplored when the sheer volume of machine data hampers the human technician's ability to search, identify and retrieve relevant machine data, and efficiently generate the user interfaces, graphs and charts that can enable the expert human technician to perform the comparisons and graph analysis that can uncover the insights. The described embodiments enable the human technician to efficiently search, identify, retrieve and present the relevant data, needed to arrive at insights regarding maintenance status of various industrial machines.

Figure 5:
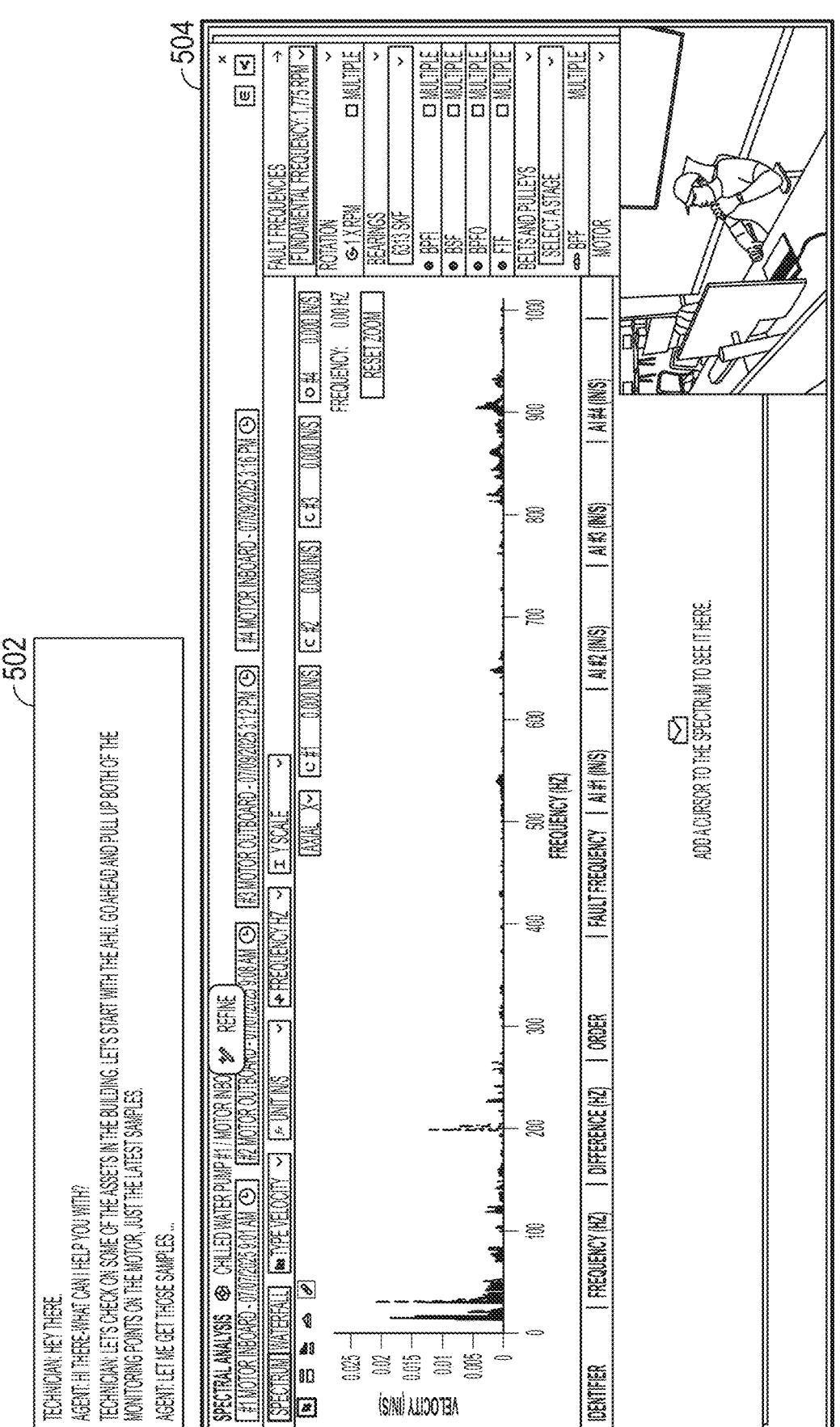
FIG. 5 illustrates diagrams of example interactions of an engineer with a primary agent of an example SRTP.

FIG. 5 illustrates diagrams 502-534 of example interactions of an engineer with the primary agent 204. The engineer engages in a colloquial and informal conversation, even using engineering slangs and shorthand terminology, in terms of the details of the request. The primary agent 204 "translates" the conversation into more concrete, precise and actionable input. For example, in diagram 502, a conversation between the engineer and the primary agent 204 includes a shorthand mention of assets ("AHU," "both monitoring points on the motor," "the latest samples"). The primary agent, having the asset tree of the plant can translate that "the AHU" and "the two monitoring points on the motor" translate to two distinct asset IDs. The time frame is the "latest samples," which the primary agent is previously instructed to translate as a selected time period (e.g., the past 12 months, 6 months, or other time period as may be appropriate for a machine or a plant). Furthermore, the primary agent 204 can detect that the user has requested two assets ("both monitoring points on the motor"), and therefore, in response, the primary agent 204 instantiates, loads or executes, the MACA 302, provides it with the "monitoring points" asset IDs. When the MACA 302 returns the relevant sample IDs from the data servers 208, the primary agent 204 generates the interactive user interface 504 (a spectral analysis window in this example). The engineer can click on the "waterfall," button to obtain a waterfall view of the different assets and their corresponding latest samples (diagram 506).

Conversation in diagram 508 shows the engineer is able to verify, by examining the graphs in the user interfaces 504, 506, that an unbalance issue was satisfactorily addressed with lubrication. In diagram 508, the engineer requests another multiple asset comparison visual ("four monitoring points for those two chilled water pumps," which the primary agent 204 responds by generating the interactive user interface 510 (also a spectral analysis graph). The engineer can access the waterfall view feature (diagram 512) by pressing the "waterfall" button.

In diagram 514, the engineer, who is a professional vibration analysis engineer engages in a conversation with the primary agent 204 about whether a level of noise the engineer has observed in the spectrum (user interfaces 516, 518) is of concern and would like to confirm his professional analysis. The primary agent 204, in this instance, is instructed to answer vibration analysis questions, and the primary agent 204 does confirm the engineer's professional hunch. As these examples show, the underlying samples for the operations of the primary agent 204 and its secondary agents can be vibration samples obtained from an accelerometer of the monitors 100, as they may be used throughout an industrial plant on multiple, sometimes hundreds or thousands of assets. Other types of samples can also be the subject of the operations of the primary agent 204 and its helper agents.

In diagram 520, the engineer requests the latest samples for a different set of assets ("both of the pumps on the chilled water pumps"). The primary agent 204 responds by generating the interactive user interface 522. The engineer can activate the waterfall view by pressing "waterfall" button, causing the user interface display 524 to be generated. As the user interfaces 522, 524 are interactive, the engineer can also click on a sample and view further details of a sample, as shown in diagram 526. The particular sample viewed in user interface 526 alerts the engineer to a potential problem. In diagram 528 the engineer requests historical samples of the same asset, in an informal conversational tone ("for the pump on chilled water pump number 2, grab the latest sample, a sample from a week ago, and a sample from two weeks ago"). The primary agent 204 detects that only a single asset is the subject of the request and historical samples for that single asset is requested. These conditions prompt the primary agent 204 to instantiate the HSA 304, and provide it with the asset ID of the subject asset. Once the HSA 304 has returned the sample IDs, the primary agent 204 generates the interactive user interface 530. The engineer can activate the waterfall view feature, by pressing the "waterfall" button. In diagram 534, the engineer engages in another conversation and asks a vibration analysis question to further investigate a suspected developing problem, which the primary agent 204 answers.

Example Implementation Mechanisms

Some embodiments are implemented by a computer system or a network of computer systems. A computer system may include a processor, a memory, and a non-transitory computer-readable medium. The memory and non-transitory medium may store instructions 406 for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 6:
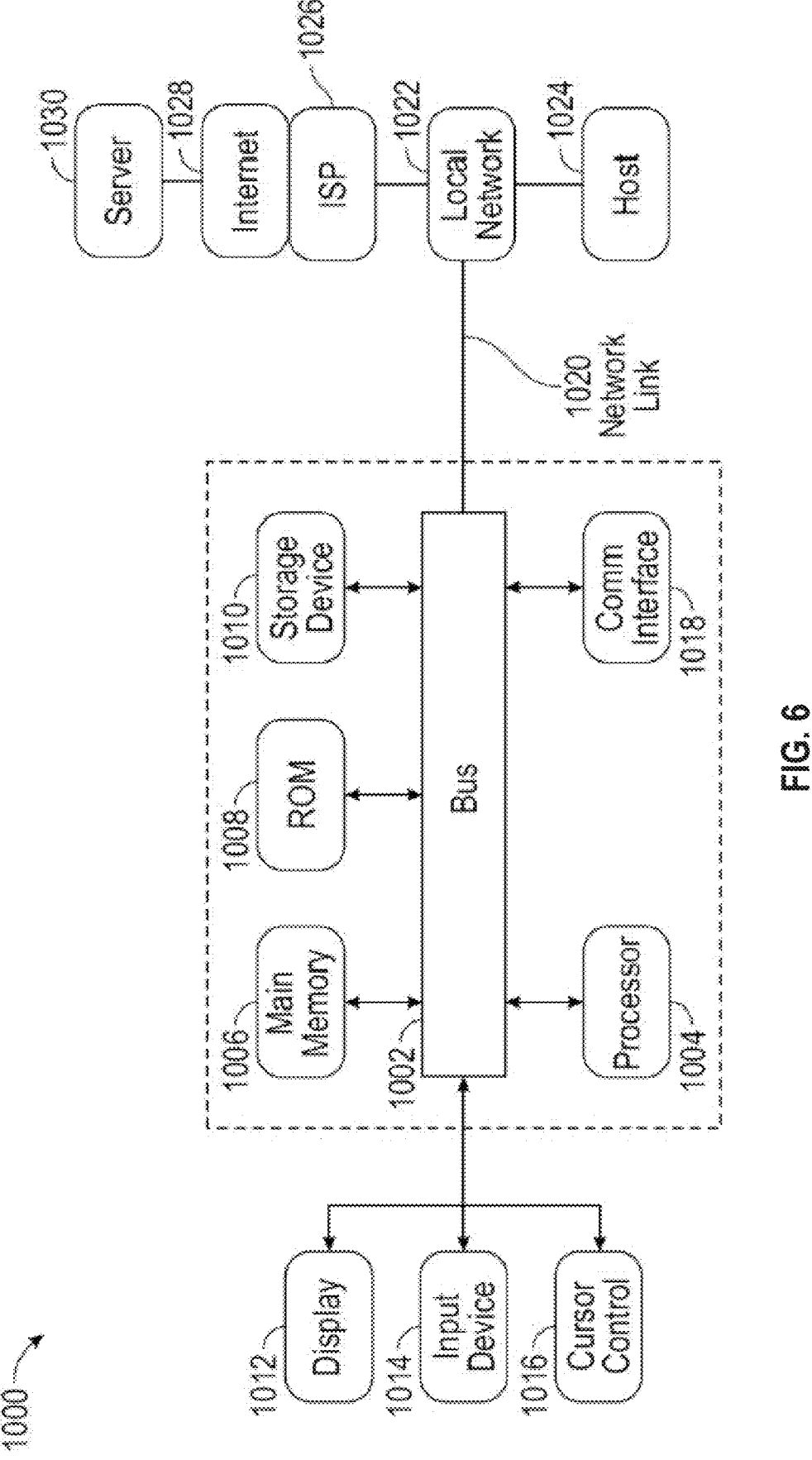
FIG. 6 is an environment in which some embodiments can be implemented.

For example, FIG. 6 is a block diagram that illustrates a computer system 1000 upon which an embodiment, or a portion thereof, can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touchscreen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP

1026, local network 1022 and communication interface 1018. The received code may be executed by processor 1004 as it is received, and/or stored in storage device 1010, or other non-volatile storage for later execution.

In some embodiments, one or more AI models can be implemented in one or more application integrated circuits for an artificial intelligence such as an artificial neural network (ANN). Such integrated circuits can represent a plurality of neurons organized in an array, where each neuron includes a register, a microprocessor, and each neuron receives at least one input. The integrated circuits can further represent a plurality of synaptic circuits, each synaptic circuit including a memory for storing a synaptic weight, where each neuron is connected to at least one other neuron via one of the plurality of the synaptic circuits.

Weights in a neural network are values that determine the importance of the input signals that a neuron receives. Weights are learnable parameters of the neural network. When a neuron receives an input signal, the input signal is multiplied by the weight associated with that input signal and provided to the neuron's processing element. The processing element sums all the weighted input signals that the neuron receives to determine the neuron's net input.

An activation function is applied to this net input to produce the neuron's output. The activation function introduces non-linearity into the network, allowing it to learn complex patterns and relationships within the data. Common activation functions include the sigmoid function, which maps the input to a value between 0 and 1, the hyperbolic tangent function, which maps the input to a value between $-1$ and 1, and the rectified linear unit (ReLU), which outputs the input directly if it is positive, otherwise it outputs zero.

The combination of weights and activation functions allows neural networks to approximate complex functions and make predictions or classifications based on input data. During training, the network adjusts the weights through a process called backpropagation, which involves calculating the gradient of the loss function with respect to each weight and updating the weights in the direction that minimizes the loss. This process is repeated iteratively until the network achieves a satisfactory level of accuracy. It is also possible to use a self-organizing neural network such as a Boltzman machine or an autoencoder.

In a hardware implementation of the described embodiments, one or more of the AI models can be executable on one or more processors, or microprocessors coupled to memory devices. The memory devices can store the executable instructions, related to the AI models. The stored executable instructions can program the processors or microprocessors to generate a plurality of neurons organized in an array in the memory devices. Each neuron can be implemented in the hardware to include or be connected to a register implemented in the processing elements, and to receive at least one neuron input. Each neuron can also be connected to a plurality of synaptic circuits, where each synaptic circuit, in turn includes additional neurons implemented in a synaptic memory for storing a synaptic weight, and an activation function. Each neuron is connected to at least one other neuron via one of the plurality of synaptic circuits. The execution of the AI models can include adjusting the synaptic weights, and executing the activation functions in a plurality of executions or runs of the AI models to generate an output. In some embodiments, time-domain signals can be combined (sensor fusion) in a reservoir architecture neural network, referred to as recurrent network in which the output layer is trained using, for example, a soft max or logistic function.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

EXAMPLES

It will be appreciated that the present disclosure may include any one and up to all of the following examples.

Example 1: A method comprising: providing a plurality of monitors, each monitor comprising: a wireless communication module, a microcontroller, an accelerometer, and a battery module, each monitor configured to collect machine samples from a machine in a plant, the monitor in wireless communication with a receiver, the receiver configured to transmit the samples to one or more data servers in a maintenance and monitoring infrastructure, the samples having associated attributes; instructing a primary LLM agent on an asset tree of the plant, the asset tree comprising asset identifiers, each asset identifier uniquely corresponding to a machine in the plant; instructing the primary LLM agent on availability of one or more secondary LLM agents and functionality, input and out specification of the secondary LLM agents; instructing each secondary LLM agent on performing a task, wherein performing the task at least in part comprises interfacing with the one or more data servers of the maintenance and monitoring infrastructure and retrieving sample identifiers from the data servers; receiving, by the primary LLM agent, a conversational user request, comprising a conversational request for samples of a machine and/or multiple machines for a time period; the primary LLM agent translating the conversational request to asset identifiers of one or more machines in the plant, based on the asset tree of the plant; the primary LLM agent, selecting, based on the conversational request, a secondary LLM agent previously instructed in performing sample identifier retrieval of the conversational request; the primary LLM agent, providing the translated asset identifiers to the selected secondary agent; the selected secondary LLM agent, retrieving sample identifiers corresponding to the translated asset identifier; the selected secondary LLM agent, providing the retrieved sample identifiers to the primary LLM agent; the primary LLM agent, generating instructions that when executed perform operations comprising: interfacing with the data servers and obtain values of samples corresponding to the retrieved sample identifiers; and generating user interfaces visualizing the sample values corresponding to the sample identifiers.

Example 2: The method of Example 1, wherein the sample attributes comprise one or more of sample identifiers, sample time stamps, and sample type.

Example 3: The method of any of Examples 1 and 2, wherein the secondary LLM agents comprise: a multiple asset comparison agent, instructed to obtain, from the data servers, sample identifiers of two or more machines for a selected time period, comprising a recent time period.

Example 4: The method of any of Examples 1-3, wherein the secondary LLM agents comprise: a historical sample agent, instructed to obtain, from the data servers, sample identifiers of a machine for a time frame, the time frame approximated based on available samples in the data servers and the time period received in the conversational request.

Example 5: The method of any of Examples 1-4, wherein the one or more data servers comprise endpoints configured to receive an asset identifier and a time period and return asset identifiers of samples having the received asset identifier and the time period, wherein the selected secondary LLM agent is configured to retrieve the sample identifiers by interfacing with the endpoints.

Example 6: The method of any of Examples 1-5, wherein generating the user interfaces comprises: instructing the primary LLM agent with a uniform resource locator (URL) map rule, the URL map rule comprising example URLs and URL formatting rules, the URL formatting rules comprising asset identifier and sample identifier locations in the example URLs, wherein executing the URL generates computer display instructions, generating the user interfaces visualizing the sample values.

Example 7: The method of any of Examples 1-6, wherein the primary LLM agent is further instructed on performing operations comprising: identifying a task from the conversational request; generating computer system instructions corresponding to the identified task; communicating the computer instructions to one or more computer systems within the maintenance and monitoring infrastructure.

Example 8: A non-transitory computer storage that stores executable program instructions that, when executed by one or more computing devices, configure the one or more computing devices to perform operations comprising: providing a plurality of monitors, each monitor comprising: a wireless communication module, a microcontroller, an accelerometer, and a battery module, each monitor configured to collect machine samples from a machine in a plant, the monitor in wireless communication with a receiver, the receiver configured to transmit the samples to one or more data servers in a maintenance and monitoring infrastructure, the samples having associated attributes; instructing a primary LLM agent on an asset tree of the plant, the asset tree comprising asset identifiers, each asset identifier uniquely corresponding to a machine in the plant; instructing the primary LLM agent on availability of one or more secondary LLM agents and functionality, input and out specification of the secondary LLM agents; instructing each secondary LLM agent on performing a task, wherein performing the task at least in part comprises interfacing with the one or more data servers of the maintenance and monitoring infrastructure and retrieving sample identifiers from the data servers;

receiving, by the primary LLM agent, a conversational user request, comprising a conversational request for samples of a machine and/or multiple machines for a time period; the primary LLM agent translating the conversational request to asset identifiers of one or more machines in the plant, based on the asset tree of the plant; the primary LLM agent, selecting, based on the conversational request, a secondary LLM agent previously instructed in performing sample identifier retrieval of the conversational request; the primary LLM agent, providing the translated asset identifiers to the selected secondary agent; the selected secondary LLM agent, retrieving sample identifiers corresponding to the translated asset identifier; the selected secondary LLM agent, providing the retrieved sample identifiers to the primary LLM agent; the primary LLM agent, generating instructions that when executed perform operations comprising: interfacing with the data servers and obtain values of samples corresponding to the retrieved sample identifiers; and generating user interfaces visualizing the sample values corresponding to the sample identifiers.

Example 9: The non-transitory computer storage of Example 8, wherein the sample attributes comprise one or more of sample identifiers, sample time stamps, and sample type.

Example 10: The non-transitory computer storage of any of Examples 8 and 9, wherein the secondary LLM agents comprise: a multiple asset comparison agent, instructed to obtain, from the data servers, sample identifiers of two or more machines for a selected time period, comprising a recent time period.

Example 11: The non-transitory computer storage of any of Examples 8-10, wherein the secondary LLM agents comprise: a historical sample agent, instructed to obtain, from the data servers, sample identifiers of a machine for a time frame, the time frame approximated based on available samples in the data servers and the time period received in the conversational request.

Example 12: The non-transitory computer storage of any of Examples 8-11, wherein the one or more data servers comprise endpoints configured to receive an asset identifier and a time period and return asset identifiers of samples having the received asset identifier and the time period, wherein the selected secondary LLM agent is configured to retrieve the sample identifiers by interfacing with the endpoints.

Example 13: The non-transitory computer storage of any of Examples 8-12, wherein generating the user interfaces comprises: instructing the primary LLM agent with a uniform resource locator (URL) map rule, the URL map rule comprising example URLs and URL formatting rules, the URL formatting rules comprising asset identifier and sample identifier locations in the example URLs, wherein executing the URL generates computer display instructions, generating the user interfaces visualizing the sample values.

Example 14: The non-transitory computer storage of any of Examples 8-13, wherein the primary LLM agent is further instructed on performing operations comprising: identifying a task from the conversational request; generating computer system instructions corresponding to the identified task; communicating the computer instructions to one or more computer systems within the maintenance and monitoring infrastructure.

Example 15: A system comprising one or more processors, wherein the one or more processors are configured to perform operations comprising: providing a plurality of monitors, each monitor comprising: a wireless communication module, a microcontroller, an accelerometer, and a battery module, each monitor configured to collect machine samples from a machine in a plant, the monitor in wireless communication with a receiver, the receiver configured to transmit the samples to one or more data servers in a maintenance and monitoring infrastructure, the samples having associated attributes; instructing a primary LLM agent on an asset tree of the plant, the asset tree comprising asset identifiers, each asset identifier uniquely corresponding to a machine in the plant; instructing the primary LLM agent on availability of one or more secondary LLM agents and functionality, input and out specification of the secondary LLM agents; instructing each secondary LLM agent on performing a task, wherein performing the task at least in part comprises interfacing with the one or more data servers of the maintenance and monitoring infrastructure and retrieving sample identifiers from the data servers; receiving, by the primary LLM agent, a conversational user request, comprising a conversational request for samples of a machine and/or multiple machines for a time period; the primary LLM agent translating the conversational request to asset identifiers of one or more machines in the plant, based on the asset tree of the plant; the primary LLM agent, selecting, based on the conversational request, a secondary LLM agent previously instructed in performing sample identifier retrieval of the conversational request; the primary LLM agent, providing the translated asset identifiers to the selected secondary agent; the selected secondary LLM agent, retrieving sample identifiers corresponding to the translated asset identifier; the selected secondary LLM agent, providing the retrieved sample identifiers to the primary LLM agent; the primary LLM agent, generating instructions that when executed perform operations comprising: interfacing with the data servers and obtain values of samples corresponding to the retrieved sample identifiers; and generating user interfaces visualizing the sample values corresponding to the sample identifiers.

Example 16: The system of Example 15, wherein the sample attributes comprise one or more of sample identifiers, sample time stamps, and sample type.

Example 17: The system of any of Examples 15 and 16, wherein the secondary LLM agents comprise: a multiple asset comparison agent, instructed to obtain, from the data servers, sample identifiers of two or more machines for a selected time period, comprising a recent time period.

Example 18: The system of any of Examples 15-17, wherein the secondary LLM agents comprise: a historical sample agent, instructed to obtain, from the data servers, sample identifiers of a machine for a time frame, the time frame approximated based on available samples in the data servers and the time period received in the conversational request.

Example 19: The system of any of Examples 15-18, wherein the one or more data servers comprise endpoints configured to receive an asset identifier and a time period and return asset identifiers of samples having the received asset identifier and the time period, wherein the selected secondary LLM agent is configured to retrieve the sample identifiers by interfacing with the endpoints.

Example 20: The system of any of Examples 15-19, wherein generating the user interfaces comprises: instructing the primary LLM agent with a uniform resource locator (URL) map rule, the URL map rule comprising example URLs and URL formatting rules, the URL formatting rules comprising asset identifier and sample identifier locations in the example URLs, wherein executing the URL generates computer display instructions, generating the user interfaces visualizing the sample values.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:

an upstream remote maintenance and monitoring infrastructure, providing a plurality of removable and portable monitors in an industrial plant, each monitor comprising: a wireless communication module, a microcontroller, an accelerometer, and a battery module, each monitor, removably attachable to a machine in the plant and configured to collect machine samples from an attached machine in the plant, the monitor wirelessly communicating the samples to a receiver in the plant, the receiver transmitting the samples to one or more data servers in the remote maintenance and monitoring infrastructure, the samples having associated attributes;

wherein the remote maintenance and monitoring infrastructure, comprises a primary LLM agent and one or more secondary LLM agents, instructing the primary LLM agent on an asset tree of the plant, the asset tree comprising asset identifiers, each asset identifier uniquely corresponding to a distinct machine in the plant;

instructing the primary LLM agent on availability of one or more secondary LLM agents and functionality, input and output specification of the secondary LLM agents;

instructing each secondary LLM agent on performing a task, wherein performing the task at least in part comprises interfacing with the one or more data servers of the maintenance and monitoring infrastructure and retrieving sample IDs from the data servers;

receiving, by the primary LLM agent, a conversational user request, comprising a conversational request for samples of a machine and/or multiple machines for a time period;

the primary LLM agent translating the conversational request to asset identifiers of one or more machines in the plant, based on the asset tree of the plant;

the primary LLM agent, selecting, based on the conversational request, a secondary LLM agent previously instructed in performing sample ID retrieval of the conversational request;

the primary LLM agent, providing the translated asset identifiers to the selected secondary agent;

the selected secondary LLM agent, retrieving sample IDs corresponding to the translated asset identifier;

the selected secondary LLM agent, providing the retrieved sample IDs to the primary LLM agent;

the primary LLM agent, generating instructions that when executed perform operations comprising:

interfacing with the data servers and obtaining values of samples corresponding to the retrieved sample IDs; and generating a visualization of the sample values corresponding to the sample IDs in a frontend user interface of the maintenance and monitoring infrastructure.

2. The method of claim 1, wherein the sample attributes comprise one or more of sample identifiers, sample time stamps, and sample type.

3. The method of claim 1, wherein the secondary LLM agents comprise:

a multiple asset comparison agent, instructed to obtain, from the data servers, sample IDs of two or more machines for a selected time period, comprising a recent time period.

4. The method of claim 1, wherein the secondary LLM agents comprise:

a historical sample agent, instructed to obtain, from the data servers, sample IDs of a machine for a time frame, the time frame approximated based on available samples in the data servers and the time period received in the conversational request.

5. The method of claim 1, wherein the one or more data servers comprise endpoints configured to receive an asset identifier and a time period and return sample IDs of samples having the received asset identifier and corresponding to the received time period, wherein the selected secondary LLM agent is configured to retrieve the sample IDs by interfacing with the endpoints.

6. The method of claim 1, wherein generating the user interfaces comprises:

instructing the primary LLM agent with a uniform resource locator (URL) map rule, the URL map rule comprising example URLs and URL formatting rules, the URL formatting rules comprising asset identifier and sample ID locations in the example URLs, wherein executing the URL generates computer display instructions, generating the user interfaces visualizing the sample values.

7. The method of claim 1, wherein the primary LLM agent is further instructed on performing operations comprising:

identifying a task from the conversational request;

generating computer system instructions corresponding to the identified task;

communicating the computer instructions to one or more computer systems within the maintenance and monitoring infrastructure.

8. A non-transitory computer storage that stores executable program instructions that, when executed by one or more computing devices, configure the one or more computing devices to perform operations comprising:

in an upstream remote maintenance and monitoring infrastructure, providing a plurality of removable and portable monitors in an industrial plant, each monitor comprising: a wireless communication module, a microcontroller, an accelerometer, and a battery module, each monitor, removably attachable to a machine in the plant and configured to collect machine samples from an attached machine in the plant, the monitor wirelessly communicating the samples to a receiver in the plant, the receiver transmitting the samples to one or more data servers in the remote maintenance and monitoring infrastructure, the samples having associated attributes;

wherein the remote maintenance and monitoring infra-structure, comprises a primary LLM agent and one or more secondary LLM agents, instructing the primary LLM agent on an asset tree of the plant, the asset tree comprising asset identifiers, each asset identifier uniquely corresponding to a distinct machine in the plant;

instructing the primary LLM agent on availability of one or more secondary LLM agents and functionality, input and output specification of the secondary LLM agents;

instructing each secondary LLM agent on performing a task, wherein performing the task at least in part comprises interfacing with the one or more data servers of the maintenance and monitoring infrastructure and retrieving sample IDs from the data servers;

receiving, by the primary LLM agent, a conversational user request, comprising a conversational request for samples of a machine and/or multiple machines for a time period;

the primary LLM agent translating the conversational request to asset identifiers of one or more machines in the plant, based on the asset tree of the plant;

the primary LLM agent, selecting, based on the conversational request, a secondary LLM agent previously instructed in performing sample IDs retrieval of the conversational request;

the primary LLM agent, providing the translated asset identifiers to the selected secondary agent;

the selected secondary LLM agent, retrieving sample IDs corresponding to the translated asset identifier;

the selected secondary LLM agent, providing the retrieved sample IDs to the primary LLM agent;

the primary LLM agent, generating instructions that when executed perform operations comprising:

interfacing with the data servers and obtaining values of samples corresponding to the retrieved sample IDs; and generating a visualization of the sample values corresponding to the sample IDs in a frontend user interface of the maintenance and monitoring infrastructure.

9. The non-transitory computer storage of claim 8, wherein the sample attributes comprise one or more of sample identifiers, sample time stamps, and sample type.

10. The non-transitory computer storage of claim 8, wherein the secondary LLM agents comprise:

a multiple asset comparison agent, instructed to obtain, from the data servers, sample IDs of two or more machines for a selected time period, comprising a recent time period.

11. The non-transitory computer storage of claim 8, wherein the secondary LLM agents comprise:

a historical sample agent, instructed to obtain, from the data servers, sample IDs of a machine for a time frame, the time frame approximated based on available samples in the data servers and the time period received in the conversational request.

12. The non-transitory computer storage of claim 8, wherein the one or more data servers comprise endpoints configured to receive an asset identifier and a time period and return sample IDs of samples having the received asset identifier and the time period, wherein the selected secondary LLM agent is configured to retrieve the sample IDs by interfacing with the endpoints.

13. The non-transitory computer storage of claim 8, wherein generating the user interfaces comprises:

instructing the primary LLM agent with a uniform resource locator (URL) map rule, the URL map rule comprising example URLs and URL formatting rules, the URL formatting rules comprising asset identifier and sample ID locations in the example URLs, wherein executing the URL generates computer display instructions, generating the user interfaces visualizing the sample values.

14. The non-transitory computer storage of claim 8, wherein the primary LLM agent is further instructed on performing operations comprising:

identifying a task from the conversational request;

generating computer system instructions corresponding to the identified task;

communicating the computer instructions to one or more computer systems within the maintenance and monitoring infrastructure.

15. A system comprising one or more processors, wherein the one or more processors are configured to perform operations comprising:

an upstream remote maintenance and monitoring infrastructure, providing a plurality of removable and portable monitors in an industrial plant, each monitor comprising: a wireless communication module, a microcontroller, an accelerometer, and a battery module, each monitor, removably attachable to a machine in the plant and configured to collect machine samples from an attached machine in the plant, the monitor wirelessly communicating the samples to a receiver in the plant, the receiver transmitting the samples to one or more data servers in the remote maintenance and monitoring infrastructure, the samples having associated attributes;

wherein the remote maintenance and monitoring infrastructure, comprises a primary LLM agent and one or more secondary LLM agents, instructing the primary LLM agent on an asset tree of the plant, the asset tree comprising asset identifiers, each asset identifier uniquely corresponding to a distinct machine in the plant;

instructing the primary LLM agent on availability of one or more secondary LLM agents and functionality, input and out specification of the secondary LLM agents;

instructing each secondary LLM agent on performing a task, wherein performing the task at least in part comprises interfacing with the one or more data servers of the maintenance and monitoring infrastructure and retrieving sample IDs from the data servers;

receiving, by the primary LLM agent, a conversational user request, comprising a conversational request for samples of a machine and/or multiple machines for a time period;

the primary LLM agent translating the conversational request to asset identifiers of one or more machines in the plant, based on the asset tree of the plant;

the primary LLM agent, selecting, based on the conversational request, a secondary LLM agent previously instructed in performing sample ID retrieval of the conversational request;

the primary LLM agent, providing the translated asset identifiers to the selected secondary agent;

the selected secondary LLM agent, retrieving sample IDs corresponding to the translated asset identifier;

the selected secondary LLM agent, providing the retrieved sample IDs to the primary LLM agent;

the primary LLM agent, generating instructions that when executed perform operations comprising:

interfacing with the data servers and obtaining values of samples corresponding to the retrieved sample IDs; and generating a visualization of the sample values corresponding to the sample IDs in a frontend user interface of the maintenance and monitoring infrastructure.

16. The system of claim 15, wherein the sample attributes comprise one or more of sample identifiers, sample time stamps, and sample type.

17. The system of claim 15, wherein the secondary LLM agents comprise:

a multiple asset comparison agent, instructed to obtain, from the data servers, sample IDs of two or more machines for a selected time period, comprising a recent time period.

18. The system of claim 15, wherein the secondary LLM agents comprise:

a historical sample agent, instructed to obtain, from the data servers, sample IDs of a machine for a time frame, the time frame approximated based on available samples in the data servers and the time period received in the conversational request.

19. The system of claim 15, wherein the one or more data servers comprise endpoints configured to receive an asset identifier and a time period and return sample IDs of samples having the received asset identifier and the time period, wherein the selected secondary LLM agent is configured to retrieve the sample IDs by interfacing with the endpoints.

20. The system of claim 15, wherein generating the user interfaces comprises:

instructing the primary LLM agent with a uniform resource locator (URL) map rule, the URL map rule comprising example URLs and URL formatting rules, the URL formatting rules comprising asset identifier and sample ID locations in the example URLs, wherein executing the URL generates computer display instructions, generating the user interfaces visualizing the sample values.

\* \* \* \* \*